US012059787B2

(12) United States Patent
Morimura et al.

(10) Patent No.: US 12,059,787 B2
(45) Date of Patent: Aug. 13, 2024

(54) DRIVING TOOL

(71) Applicant: MAX CO., LTD., Tokyo (JP)

(72) Inventors: Takashi Morimura, Tokyo (JP); Hisashi Kobayashi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/740,663

(22) Filed: May 10, 2022

(65) Prior Publication Data

US 2022/0355453 A1 Nov. 10, 2022

(30) Foreign Application Priority Data

May 10, 2021 (JP) ................................ 2021-079682

(51) Int. Cl.
*B25C 1/06* (2006.01)

(52) U.S. Cl.
CPC .................................... *B25C 1/06* (2013.01)

(58) Field of Classification Search
CPC ........................................................ B25C 1/06
See application file for complete search history.

(56) References Cited

U.S. PATENT DOCUMENTS 5,511,715 A * 4/1996 Crutcher ................... B25C 1/06 227/8
6,971,567 B1 * 12/2005 Cannaliato ................ B25C 1/06 173/205
2009/0179062 A1 * 7/2009 Shima ....................... B25C 1/06 227/2
2011/0303428 A1 * 12/2011 Roth ....................... B25C 1/008 173/1
2016/0144496 A1 * 5/2016 Raggl ....................... B25C 1/10 29/432
2017/0217004 A1 * 8/2017 Kato ......................... B25C 5/15
2019/0202043 A1 * 7/2019 Noguchi ................... B25C 1/04
2021/0021215 A1 * 1/2021 Tsai ...................... H02P 7/2913
2021/0138622 A1 * 5/2021 Enta ........................ B25C 1/047
2021/0354277 A1 * 11/2021 Morimura ................. H02P 6/24

FOREIGN PATENT DOCUMENTS

EP 2826600 A1 * 1/2015 ............ B25C 1/008
EP 3479964 A1 5/2019
EP 3670090 A1 * 6/2020 ............... B25C 1/06
JP 2015-030052 A 2/2015
JP 2015030052 A * 2/2015
JP 2017-136656 A 8/2017
JP 2017136656 A * 8/2017 ............... B25C 5/15
WO WO-2014061807 A1 * 4/2014 ............... B25C 1/04
WO WO-2021106497 A1 * 6/2021

OTHER PUBLICATIONS

Extended European Search Report dated Oct. 13, 2022, issued by the European Patent Office in the corresponding European Patent Application No. 22172439.6. (7 pages).

* cited by examiner

*Primary Examiner* — Lucas E. A. Palmer
(74) *Attorney, Agent, or Firm* — Banner & Witcoff, Ltd.

(57) ABSTRACT

A driving tool comprising: a plunger; a motor configured to move the plunger from a bottom dead center to a top dead center; a driving unit configured to use the plunger to drive a fastener by moving the plunger from the top dead center to the bottom dead center; a voltage fluctuation information acquisition unit configured to acquire voltage fluctuation information indicating a fluctuation amount of a voltage applied to the motor during movement of the plunger; and a control unit configured to control the motor based on the voltage fluctuation information.

5 Claims, 13 Drawing Sheets

DRIVING TOOL

CROSS-REFERENCE TO RELATED APPLICATIONS

This application is based upon and claims the benefit of priority from prior Japanese patent application No. 2021-079682, filed on May 10, 2021, the entire contents of which are incorporated herein by reference.

TECHNICAL FIELD

The present invention relates to a driving tool.

BACKGROUND ART

A driving tool configured to drive a plunger by using a motor so as to drive nails, studs, staples, pins, and the like (hereinafter referred to as "fasteners") is known.

JP-A-2017-136656 (hereinafter, referred to as Patent Literature 1) describes an invention configured to prevent a change in a stop position of a plunger due to a decrease in a battery voltage and, as a result, a change in time required for driving the fastener. Specifically, a driving tool that controls time of energization to a motor based on the battery voltage is described.

JP-A-2015-30052 (hereinafter, referred to as Patent Literature 2) describes a driving tool capable of improving positional accuracy of a plunger by determining timing when a motor is stopped with reference to time when a peak of a current flowing through the motor is detected.

However, in the case of the driving tool described in Patent Literature 1, the time of energization to the motor is set based only on the battery voltage. Therefore, if it is assumed that the plunger is moved at the same speed each time, it can be considered that the plunger is stopped at the same position.

However, in practice, since the speed of the plunger varies due to various influences such as wear of components, it is difficult to stabilize the stop position of the plunger.

In addition, in the case of the driving tool described in Patent Literature 2, if the peak of the current cannot be detected, it is difficult to determine the timing when the motor is stopped. For example, the current peak cannot be detected in a case where a start load increases since the plunger is stopped on a top dead center side relative to an assumed stop position, and as a result, an upper limit value of a current is reached at the time of starting. Therefore, reference timing of the stop position of the plunger cannot be determined.

Therefore, an object of the present invention is to provide a driving tool capable of stabilizing a stop position of a plunger.

SUMMARY

A driving tool according to a first aspect of the present disclosure includes: a plunger; a motor configured to move the plunger from a bottom dead center to a top dead center; a driving unit configured to use the plunger to drive a fastener by moving the plunger from the top dead center to the bottom dead center; a voltage fluctuation information acquisition unit configured to acquire voltage fluctuation information indicating a fluctuation amount of a voltage applied to the motor during movement of the plunger; and a control unit configured to control the motor based on the voltage fluctuation information.

The voltage fluctuation information acquisition unit may be configured to acquire the voltage fluctuation information indicating the fluctuation amount of the voltage applied to the motor while the plunger is moving from the bottom dead center to the top dead center.

The voltage fluctuation information acquisition unit may also be configured to acquire the voltage fluctuation information indicating the fluctuation amount of the voltage applied to the motor while the plunger is moving from the top dead center to the bottom dead center.

Here, the term "the fluctuation amount of the voltage" is information indicating an amount of fluctuation of the voltage per unit time. The information indicating the fluctuation amount of the voltage may be a derivative of the voltage.

In addition, the term "the voltage applied to the motor" may be a battery voltage in a driving tool in which a DC voltage is applied from a battery to the motor.

The control unit may also be configured to control the motor based on an inflection point of the voltage.

Here, the term "the inflection point of the voltage" is time when a fluctuation amount of the fluctuation amount of the voltage per unit time changes from positive to negative, or from negative to positive. When the fluctuation amount of the fluctuation amount of the voltage per unit time changes from positive to negative, or from negative to positive, it may be time when a second derivative of the voltage becomes zero, or time approximate to that time.

A driving tool according to a second aspect of the present disclosure includes: a plunger; a motor configured to move the plunger from a bottom dead center to a top dead center; a driving unit configured to use the plunger to drive a fastener by moving the plunger from the top dead center to the bottom dead center; a current fluctuation information acquisition unit configured to acquire current fluctuation information indicating a fluctuation amount of a current flowing through the motor during movement of the plunger; and a control unit configured to control the motor based on the current fluctuation information.

The current fluctuation information acquisition unit may be configured to acquire the current fluctuation information indicating the fluctuation amount of the current flowing through the motor while the plunger is moving from the bottom dead center to the top dead center.

The current fluctuation information acquisition unit may also be configured to acquire the current fluctuation information indicating the fluctuation amount of the current flowing through the motor while the plunger is moving from the top dead center to the bottom dead center.

Here, the term "the fluctuation amount of the current" is information indicating an amount of fluctuation of the current per unit time. The information indicating the fluctuation amount of the current may be a derivative of the current.

In addition, the term "the current flowing through the motor" may be a winding current flowing through a winding of any phase in a driving tool that drives a plunger by a three-phase brushless motor.

The control unit may also be configured to control the motor based on an inflection point of the current.

Here, the term "the inflection point of the current" is time when a fluctuation amount of the fluctuation amount of the current per unit time changes from positive to negative, or from negative to positive. When the fluctuation amount of the fluctuation amount of the current per unit time changes from positive to negative, or from negative to positive, it may be time when a second derivative of the current becomes zero, or time approximate to that time.

Further, a speed information acquisition unit configured to acquire speed information indicating a moving speed of the plunger after the plunger is moved from the top dead center to the bottom dead center may further be included, and the control unit may further be configured to control the motor based on the speed information.

The speed information acquisition unit may also be configured to acquire the speed information indicating the moving speed of the plunger while the plunger is moving from the bottom dead center to a standby position. The standby position is set between the bottom dead center and the top dead center.

Instead of the above, the speed information acquisition unit may also be configured to acquire the speed information indicating the moving speed of the plunger after the fastener is driven.

In addition, the control unit may be further configured to start control to reduce a rotation speed of the motor based on the speed information.

In addition, according to a third aspect of the present disclosure, a temperature information acquisition unit configured to acquire temperature information of the motor may be further included, and the control unit may be configured to control the motor based on the temperature information.

Here, the control unit may be further configured to start control to reduce the rotation speed of the motor based on the temperature information.

A battery configured to apply a voltage to the motor may be further included, and the voltage fluctuation information acquisition unit may be configured to acquire information indicating a fluctuation amount of a power supply voltage of the battery as the voltage fluctuation information.

A driving tool according to a fourth aspect of the present disclosure includes: a plunger; a motor configured to move the plunger from a bottom dead center to a top dead center; a driving unit configured to use the plunger to drive a fastener by moving the plunger from the top dead center to the bottom dead center; a speed information acquisition unit configured to acquire speed information indicating a moving speed of the plunger after the plunger is moved from the top dead center to the bottom dead center; and a control unit configured to control the motor based on the speed information.

A driving tool according to a fifth aspect of the present disclosure includes: a plunger; a motor configured to move the plunger from a bottom dead center to a top dead center; a driving unit configured to use the plunger to drive a fastener by moving the plunger from the top dead center to the bottom dead center; a speed information acquisition unit configured to acquire speed information indicating a moving speed of the plunger after the fastener is driven by using the plunger; and a control unit configured to control the motor based on the speed information.

The speed information acquisition unit may also be configured to acquire the speed information indicating the moving speed of the plunger while the plunger is moving from the bottom dead center to a standby position. The standby position is set between the bottom dead center and the top dead center.

The control unit may be further configured to start control to reduce the rotation speed of the motor based on the speed information.

A driving tool according to a sixth aspect of the present disclosure includes: a plunger; a motor configured to move the plunger from a bottom dead center to a top dead center; a driving unit configured to use the plunger to drive a fastener by moving the plunger from the top dead center to the bottom dead center; a temperature information acquisition unit configured to acquire temperature information of an electrical component mounted on the driving tool; and a control unit configured to control the motor based on the temperature information.

The electrical component includes an electronic device mounted on the driving tool.

The electrical component may be the motor (including a stator winding).

The electrical component may be the control unit, and in particular, may be a switching element of the control unit.

The temperature information acquisition unit may be attached in contact with or in close contact with the electrical component so as to directly acquire temperature of the electrical component, or may be attached at a position separated from the electrical component so as to be capable of indirectly acquire the temperature of the electrical component. For example, the temperature information acquisition unit may be provided on a printed wiring board on which an inverter circuit is mounted, or may be provided close to the motor.

DESCRIPTION OF EMBODIMENTS

Hereinafter, an embodiment of the present invention will be described with reference to the drawings. The following embodiment is an example for explaining the present invention, and is not intended to limit the present invention only to the embodiment.

Figure 1:
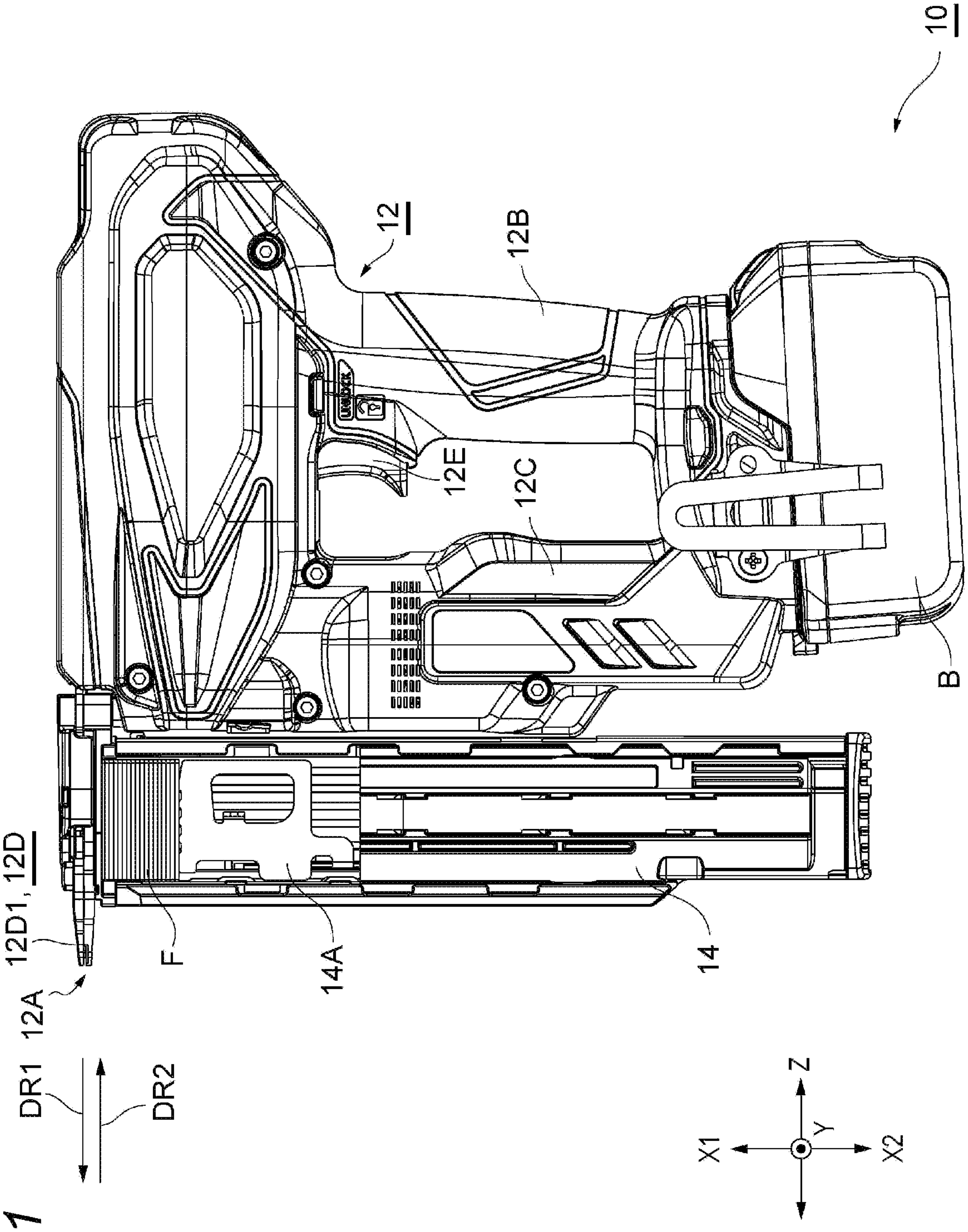
FIG. 1 is a front view of a driving tool according to one embodiment.
Figure 2:
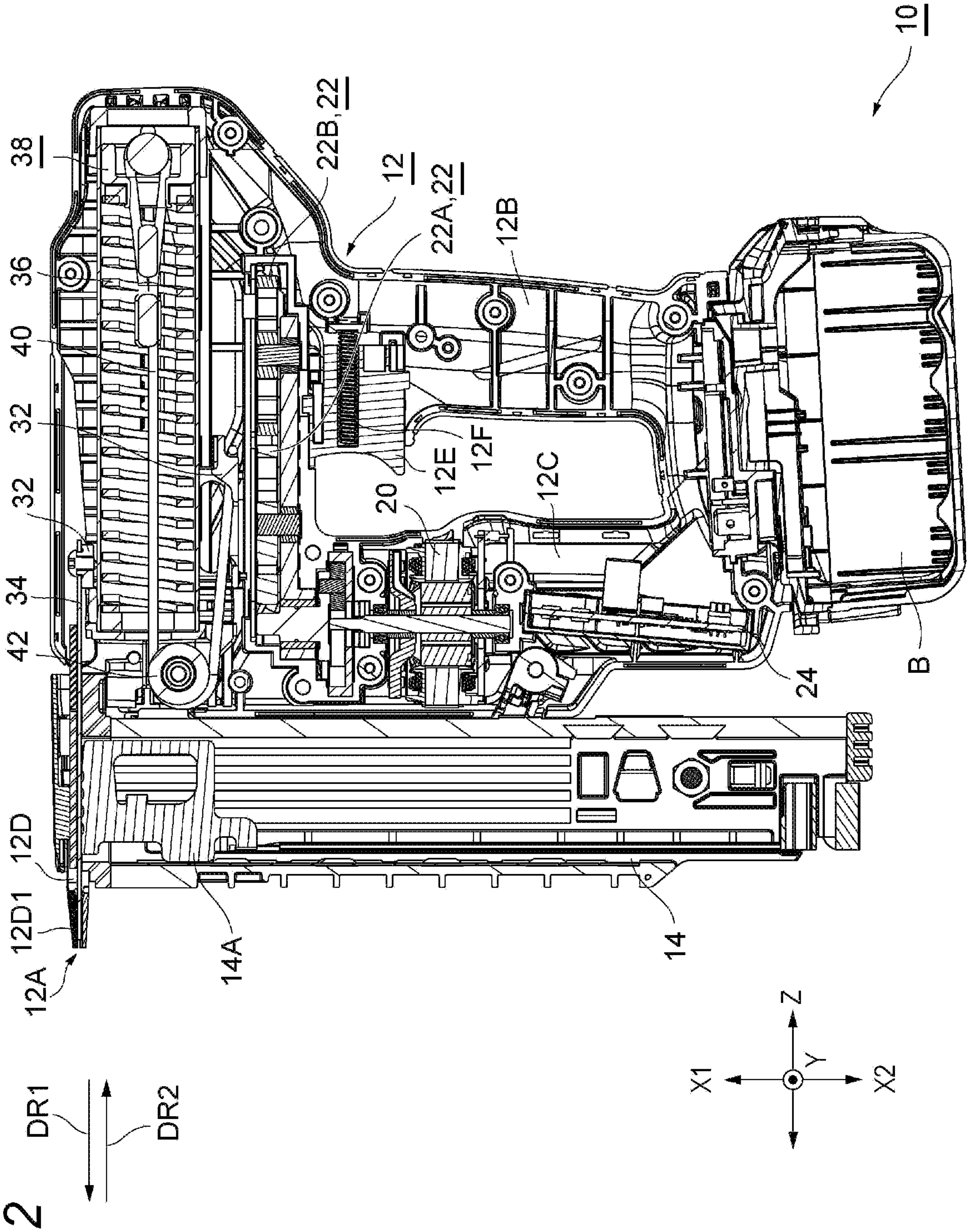
FIG. 2 is a cross-sectional view of the driving tool according to the embodiment.

[First Embodiment] FIG. 1 shows a front view of an electric driving tool 10 according to a first embodiment (however, a partial cross-sectional view of a magazine portion is shown). FIG. 2 is a cross-sectional view of the driving tool 10 as viewed from the same direction (however, a state after all fasteners F in a magazine 14 are launched is shown). The driving tool 10 is an electric nailer configured to be capable of driving a nail (an example of the "fastener F") by driving a plunger 32 (FIG. 2) through using a motor (FIG. 2). In the present specification, "up and down", "front and rear", and "right and left" are based on an attitude of the driving tool 10 in FIGS. 1 and 2. A leftward direction on paper in FIGS. 1 and 2 corresponds to a direction in which the fastener F is launched, and thus may be referred to as a launch direction DR1 or a projecting direction DR1. A rightward direction on paper opposite to the launch direction DR1 may be referred to as a separating direction DR2 since the rightward direction is a direction away from an outlet 12A where the fastener F is launched. The directions may be expressed by using a direction X1, a direction X2, a direction Y, and a direction Z shown in the drawings.

The driving tool 10 includes: a housing 12; the magazine 14 that accommodates the fastener F to be launched by the driving tool 10; a driver 34 configured to launch the fastener F; the plunger 32 to which the driver 34 is attached; a motor 20 and a gear 22 configured to move the plunger 32 from a bottom dead center to a top dead center; a coil spring 36 (an example of an "urging member" to a "driving unit") that applies a driving force for moving the plunger 32 from the top dead center to the bottom dead center; a moving member 38 disposed at an extended end portion of the coil spring 36; a wire 40 (an example of a "string-shaped member") that engages with the plunger 32 and the moving member 38 so as to interlock the plunger 32 and the moving member 38; and a pulley 42 (an example of a "direction changing member") on which the wire 40 is hooked. Further, a battery B is detachably attached to the driving tool 10.

The driving tool 10 includes the housing 12 (hereinafter, the housing 12 and a portion fixed to the housing 12 may be referred to as a "tool body") that accommodates main components of the driving tool 10 including the plunger 32. The housing 12 is provided with a grip portion 12B to be gripped by an operator, a bridge portion 12C connecting a battery attachment portion to which the battery B is attached and the motor 20, and a nose portion 12D configured to launch the fastener F. The grip portion 12B and the bridge portion 12C are each formed in, for example, a columnar shape extending in the up-down direction so as to be easily gripped by the operator. The nose portion 12D where the outlet 12A for launching the fastener F in the leftward direction on paper is formed is provided at a front end of the housing 12 (and a front end of the driving tool 10). A contact arm 12D1 may be attached to a tip end of the nose portion 12D. The contact arm 12D1 is provided around the outlet 12A so as to be capable of projecting and retracting from the outlet 12A, and functions as a safety device that permits the launching of the fastener F only in a state where the contact arm 12D1 is pressed against a driving destination object while a trigger 12E is pressed.

The housing 12 is provided with the trigger 12E. The trigger 12E allows the battery B and the motor 20 to be electrically connected to each other when a user presses the trigger 12E. The trigger 12E is provided to be exposed on a surface that faces forward (toward the launch direction DR1 of the fastener F) of the grip portion 12B, and is urged forward (toward the launch direction DR1) by a trigger urging member 12F such as a spring, for example.

The battery B is detachably attached to lower end portions of the grip portion 12B and the bridge portion 12C. The battery B functions as a DC power supply that supplies electric power for driving a motor or the like, and is formed of, for example, a lithium ion battery capable of outputting a predetermined (for example, 14V to 20V) DC voltage. The driving tool 10 can be carried and used when the battery B is attached. However, the battery B may also be configured to be accommodated in the housing 12, or the electric power may also be supplied by means other than the battery.

The driving tool 10 includes the magazine 14 attached below the nose portion 12D. The magazine 14 is configured such that a plurality of the fasteners F (FIG. 1) connected to each other can be loaded therein. The magazine 14 includes a pusher 14A that urges each fastener F toward the nose portion 12D. The pusher 14A is urged by an urging member (not shown) such that, when a leading fastener F is launched by the driver 34, an adjacent fastener F is supplied to a projecting path of the nose portion 12D.

Figure 3:
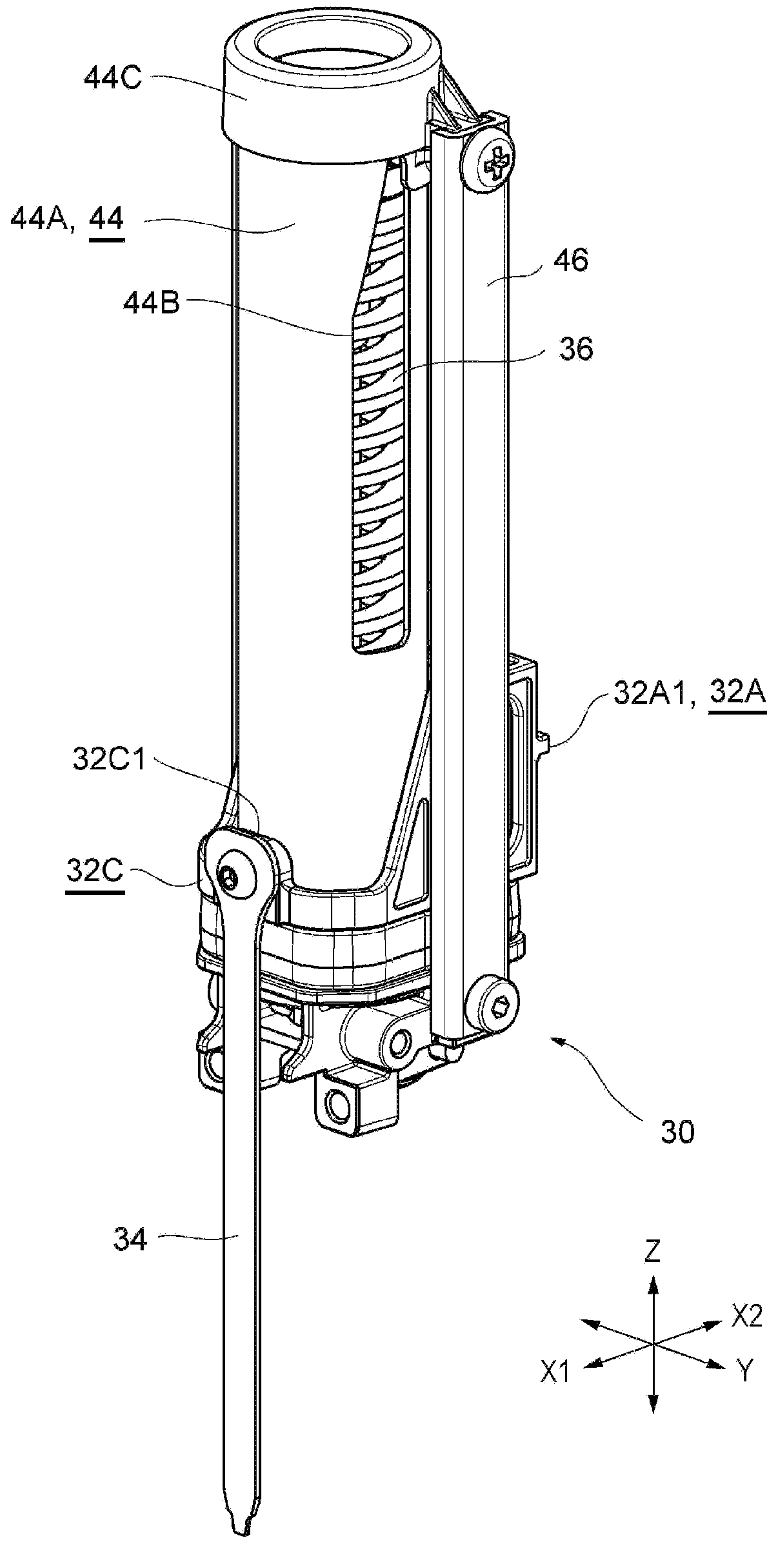
FIG. 3 is a perspective view of a plunger assembly according to the embodiment.
Figure 4:
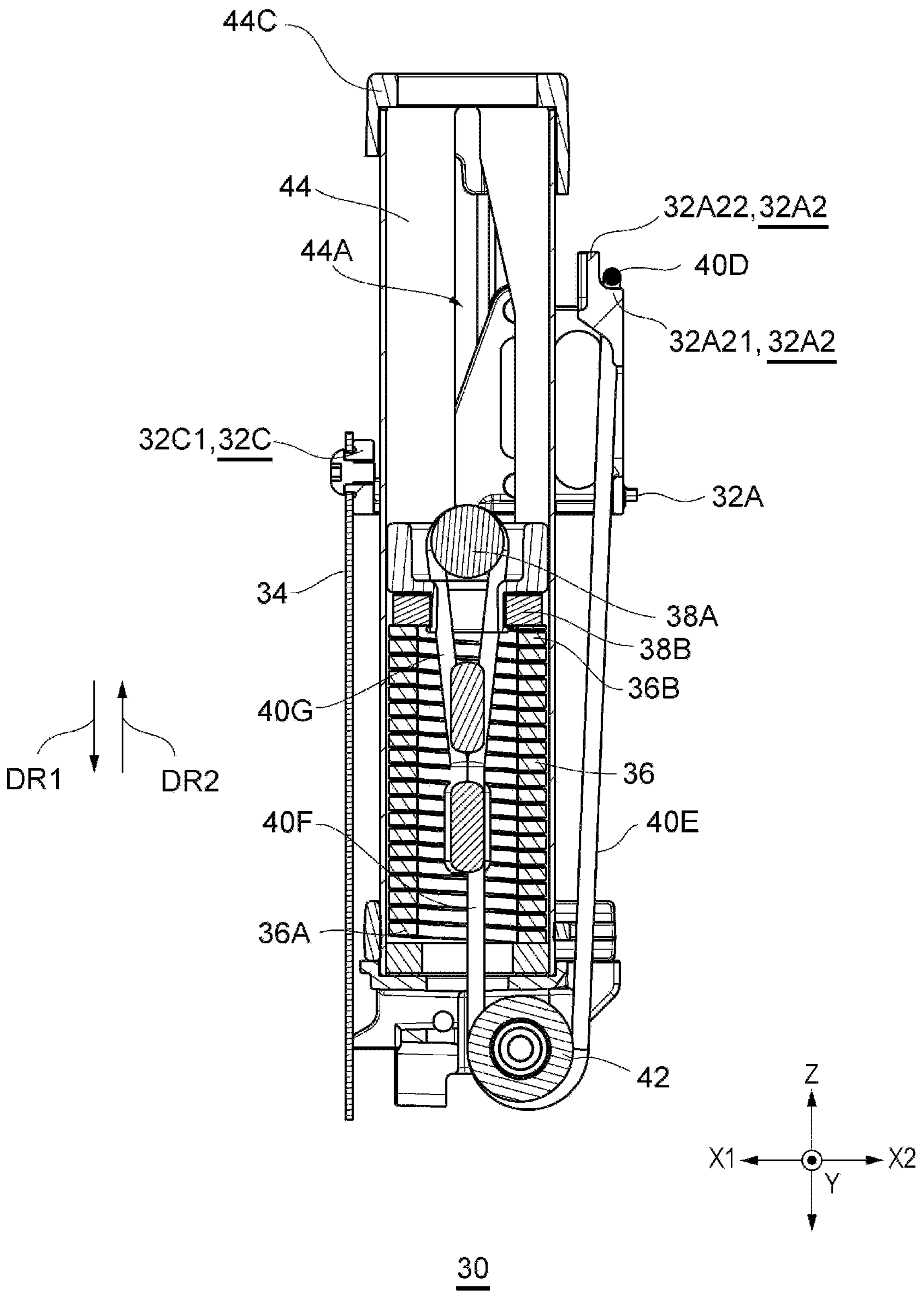
FIG. 4 is a cross-sectional view (a front view) of the plunger assembly according to the embodiment.
Figure 5:
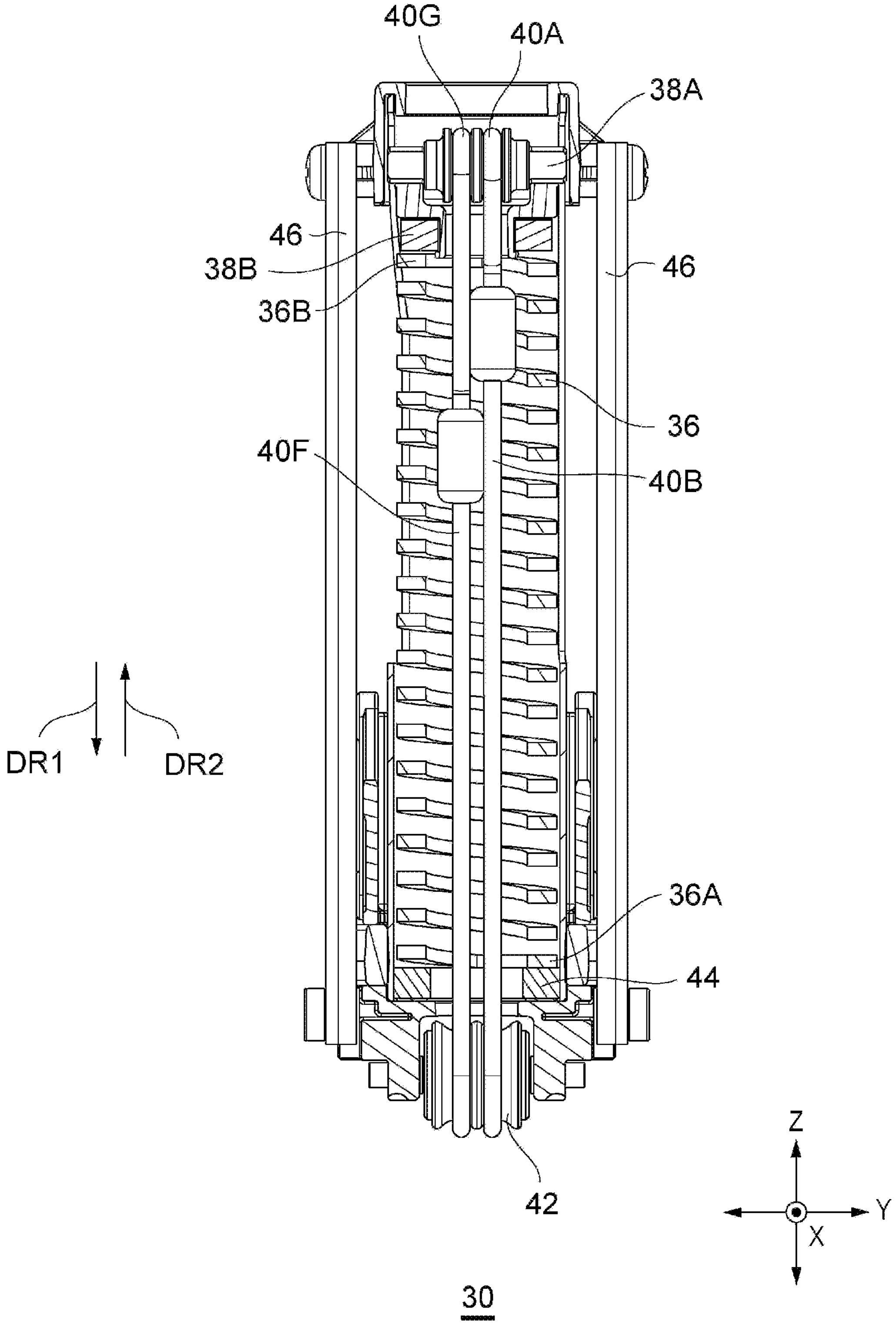
FIG. 5 is a cross-sectional view (a side view) of the plunger assembly according to the embodiment.
Figure 6:
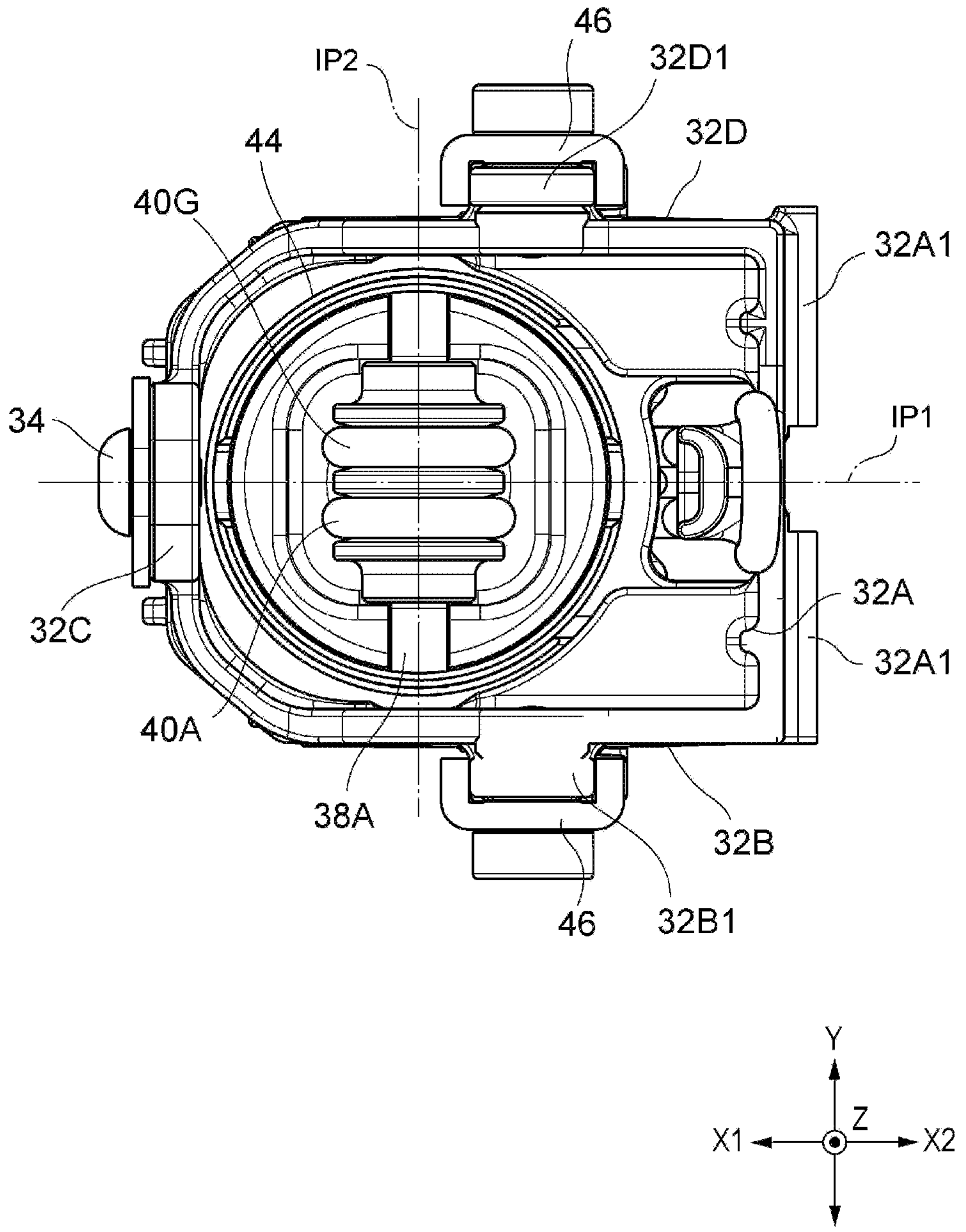
FIG. 6 is a cross-sectional view (a plan view) of the plunger assembly according to the embodiment.
Figure 7:
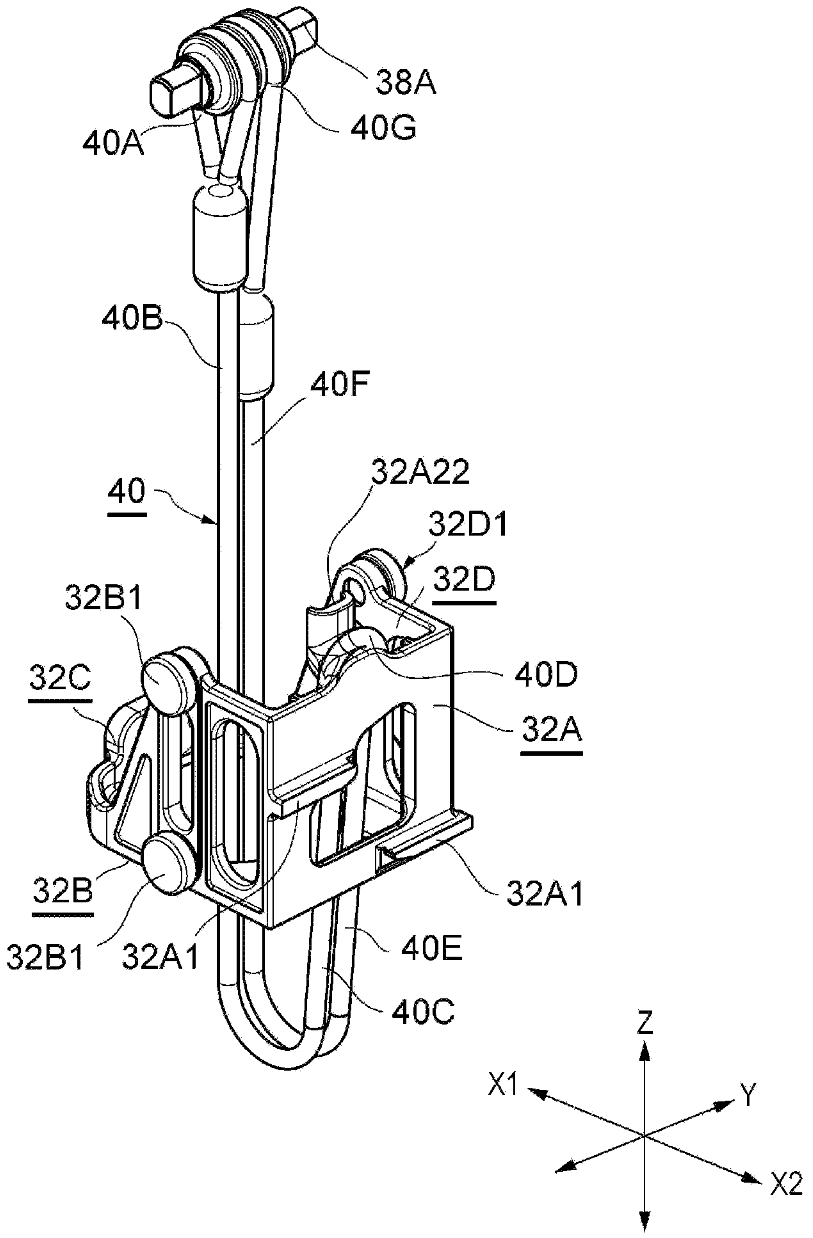
FIG. 7 is a perspective view including a plunger and a wire according to the embodiment.

The driving tool 10 further includes a plunger assembly 30. FIG. 3 is a perspective view of the plunger assembly 30. FIGS. 4 and 5 are cross-sectional views of the plunger assembly 30 in a state where the coil spring 36 is most compressed (an example of a "first state") and in a state where the coil spring 36 is most extended (an example of a "second state") (FIG. 4 is a cross-sectional view in a front view while FIG. 5 corresponds to a cross-sectional view in a left side view). FIG. 6 is a cross-sectional view of the plunger assembly 30 in a plan view. FIG. 7 is a perspective view showing the plunger 32, a pin 38A that is a part of the moving member 38, and the wire 40 that is engaged with the plunger 32 and the moving member 38. The plunger assembly 30 includes the driver 34, the plunger 32, the coil spring 36, the moving member 38, the wire 40, the pulley 42, and further includes a cylinder 44 that accommodates the coil spring 36, and a pair of guide rails 46 that restrict a moving direction of the plunger 32.

The driver 34 is a member that comes into contact with and strikes the fastener F so as to launch the fastener F. As shown in these drawings, the driver 34 according to the present embodiment is formed of a metal rigid body formed in an elongated rod shape extending in the launch direction DR1 of the fastener F. Since the fastener F is disposed on an extension line of the driver 34, when the driver 34 moves in the launch direction DR1, a front end of the driver 34 strikes the fastener F. A rear end of the driver 34 is connected to the plunger 32 and is configured to move integrally with the plunger 32.

The plunger 32 is a member configured to move from the top dead center to the bottom dead center so as to move integrally with the driver 34 and launch the fastener F. As shown in FIG. 7, the plunger 32 includes four side wall portions including: a first side wall portion 32A with which the wire 40 is engaged; a second side wall portion 32B that is connected to the first side wall portion 32A substantially at a right angle and is engaged with each guide rail 46; a third side wall portion 32C with which the driver 34 is engaged, the third side wall portion 32C being connected to the second side wall portion 32B substantially at a right angle and provided substantially parallel to the first side wall portion 32A; and a fourth side wall portion 32D that is connected to the third side wall portion 32C and the first side wall portion 32A substantially at a right angle so as to be provided substantially parallel to the second side wall portion 32B, and is engaged with each guide rail 46. The cylinder 44, which will be described later, is disposed in a hollow region surrounded by the four side wall portions. On an outer wall surface of the first side wall portion 32A, gear engagement portions 32A1 that are two convex portions provided at different heights are provided. The plunger 32 is configured to move from the bottom dead center toward the top dead center against an elastic force (an urging force) of the coil spring 36 by engagement between the gear engagement portions 32A1 and the gear 22, which will be described later. Here, the top dead center of the plunger 32 is set in a region on a rear end side of the tool body, and the bottom dead center is set in a region between the top dead center and the nose portion 12D. Therefore, when the plunger 32 moves from the top dead center to the bottom dead center, the plunger 32 moves in the launch direction DR1 so as to approach the outlet 12A, and when the plunger 32 moves from the bottom dead center to the top dead center, the plunger 32 moves in the separating direction DR2 so as to be separated from the outlet 12A.

The first side wall portion 32A of the plunger 32 is further provided with a wire engagement portion 32A2. The wire engagement portion 32A2 includes a first portion 32A21 formed to protrude in an inward direction from an inner wall surface of the first side wall portion 32A (that is, in a direction approaching the third side wall portion 32C), and a second portion 32A22 extending in a direction approaching the top dead center from an end portion of the first portion 32A21. A surface facing the top dead center of the first portion 32A21 serves as a pressure receiving surface configured to apply a force in the launch direction DR1 from the wire 40 to the plunger 32. In addition, the second portion 32A22 restricts the wire 40 from being displaced in the direction approaching the third wall portion. Further, since the first portion 32A21 is formed to protrude in the direction approaching the third side wall portion 32C, the wire 40 engaged with the pressure receiving surface of the first portion 32A21 can be extended along the inner wall surface of the first side wall portion 32A. Therefore, it is also possible to prevent the wire 40 from being displaced in a direction away from the third side wall portion 32C. In addition, the wire engagement portion 32A2 is formed symmetrically relative to a virtual plane IP1 (FIG. 6) that is parallel to planes approximate to the second side wall portion 32B and the fourth side wall portion 32D and has the same distance from both planes. With such a configuration, it is possible to prevent the plunger 32 from being inclined due to imbalance of forces acting on the plunger 32 from the wire 40.

The second side wall portion 32B and the fourth side wall portion 32D are formed symmetrically relative to the virtual plane IP1. The second side wall portion 32B and the fourth side wall portion 32D are respectively provided with guide rollers 32B1 and 32D1 configured to engage with the guide rails 46. Since two of the guide rollers 32B1 and 32D1 are provided on the top dead center side and the bottom dead center side, respectively, by engaging each two guide rollers 32B1 and 32D1 with the guide rails 46, respectively, it is possible to prevent the inclination of the plunger 32 at the time of movement.

The third side wall portion 32C is provided with a driver engagement portion 32C1 that is formed symmetrically relative to the virtual plane IP1 and to which the rear end of the driver 34 is connected. Therefore, it is possible to prevent the plunger 32 from inclining due to a reaction force received by the plunger 32 when the driver 34 strikes the fastener F.

As shown in these drawings, the plunger 32 is configured such that a distance between the driver engagement portion 32C1 and the outlet 12A is shorter than a distance between the wire engagement portion 32A2 and the outlet 12A when the moving direction of the plunger 32 (a direction connecting the top dead center and the bottom dead center) is used as a reference.

The cylinder 44 is a member that accommodates the coil spring 36 and guides a moving direction of the pin 38A that forms a part of the moving member 38. The cylinder 44 according to the present embodiment includes a cylindrical portion 44A that is formed in a cylindrical shape, and a cap portion 44C that corresponds to a lid of the cylindrical portion 44A. The cylinder 44 penetrates the hollow region surrounded by the four side wall portions of the plunger 32, and is fixed to the housing 12 such that the moving direction of the plunger 32 and a central axis of the cylinder 44 are substantially parallel to each other while the cap portion 44C fixes the guide rails 46.

The coil spring 36 that is formed of a compression spring that can extend and contract in a direction along the central axis of the cylinder 44, that is, in the moving direction of the plunger 32, is accommodated inside the cylinder 44. One end 36A of the coil spring 36 is fixed to a bottom surface of the cylinder on an outlet side (on a bottom dead center side of the plunger 32). The moving member 38 is disposed at the other end 36B of the coil spring 36, and tension is applied to the moving member 38 by the wire 40 toward the one end 36A of the coil spring 36. Therefore, the other end 36B of the coil spring and the moving member 38 are both configured to be movable. When the coil spring 36 is compressed from an extended state, the other end 36B of the coil spring and the moving member 38 are moved in the launch direction DR1, and when the coil spring 36 is extended and restored from a compressed state, the other end 36B of the coil spring and the moving member 38 are moved in the separating direction DR2 so as to be separated from the outlet 12A. A pair of holes 44B extending parallel to the central axis, that is, parallel to an extension direction of the coil spring 36, are formed in a wall portion of the cylinder 44.

The moving member 38 is directly or indirectly engaged with a part of the wire 40 so as to move the wire 40 along with extension of the other end 36B of the coil spring. The moving member 38 according to the present embodiment includes an annular portion 38B that is disposed at the other end 36B of the coil spring, and the pin 38A that is fixed to the annular portion 38B and with which both end portions of the wire 40 are engaged. In the present embodiment, the pair of holes 44B formed in the wall portion of the cylinder 44 are formed so as to intersect with a virtual plane IP2 (FIG. 6) that is parallel to two planes approximate to the first side wall portion 32A and the third side wall portion 32C of the plunger 32 and passes through central axes of the cylinder 44 and the coil spring 36. In addition, two end portions of the pin 38A are engaged with the pair of holes 44B such that an extension direction of the pin 38A is substantially parallel to the virtual plane. Therefore, even when the moving member 38 including the pin 38A is moved in the central axis direction of the cylinder 44 in accordance with extension or compression of the coil spring 36, it is possible to prevent the pin 38A from being twisted in a circumferential direction of the cylinder 44.

The wire 40 is a member that is attached to the moving member 38 and the plunger 32 so as to interlock the moving member 38 and the plunger 32. In the present embodiment, at one end of the wire 40, a ring shape is formed by connecting one end portion of the wire 40 and a portion separated from the end portion of the wire 40, and the pin 38A is engaged with the wire 40 by penetrating the portion formed in the ring shape. The wire 40 that engages with the pin 38A passes through a hole of the annular portion 38B of the moving member 38, extends in the launch direction DR1 along the central axis of the coil spring 36, passes through a hole formed in the bottom surface of the cylinder 44 and is then wound around the pulley 42 so as to change a direction thereof, extends in the separating direction DR2, and engages with the pressure receiving surface of the wire engagement portion 32A2 of the plunger 32. Subsequently, the wire 40 extends in the launch direction DR1, then is wound around the pulley 42 so as to change the direction thereof, and extends in the separating direction DR2 along the central axis of the coil spring 36. At the other end of the wire 40, a ring shape is formed by connecting the other end portion of the wire 40 and a portion separated from the end portion of the wire 40, and the pin 38A is engaged with the wire 40 by penetrating the portion formed in the ring shape. Therefore, the both ends of the wire 40 are engaged with the pin 38A, and an intermediate portion of the wire 40 is engaged with the plunger 32.

That is, the wire 40 includes: a first portion 40A including the one end portion that engages with the moving member 38; a second portion 40B including a portion that is connected to the first portion 40A and extends in the launch direction DR1; a third portion 40C including a portion that is connected to the second portion 40B and extends substantially in the separating direction; a fourth portion 40D that is connected to the third portion 40C and engages with the plunger 32; a fifth portion 40E including a portion that is connected to the fourth portion 40D and extends substantially in the launch direction DR1; a sixth portion 40F including a portion that is connected to the fifth portion 40E and extends in the separating direction DR2; and a seventh portion 40G including the other end portion that is connected to the sixth portion 40F and engages with the moving member 38.

A drive mechanism configured to move the plunger 32 from the bottom dead center to the top dead center includes the motor 20 and the gear 22. The motor 20 according to the present embodiment shown in FIG. 2 is constituted by a three-phase DC brushless motor, and is disposed, for example, in the bridge portion 12C such that an output shaft of the motor 20 is substantially perpendicular to the launch direction DR1 and the separating direction DR2. A gear whose rotation shaft is the output shaft of the motor 20 and a first gear 22A constituting the gear 22 mesh with each other, and the first gear 22A meshes with a second gear 22B constituting the gear 22. The first gear 22A is disposed in the separating direction DR2 relative to the gear of the output shaft of the motor 20, and the second gear 22B is disposed in the separating direction DR2 relative to the first gear 22A. Each of the first gear 22A and the second gear 22B is provided with a torque roller (not shown) that is parallel to the rotation shaft and protrudes in a direction approaching the outer wall surface of the first side wall portion 32A of the plunger 32. The torque roller rotates about a central axis of the first gear 22A (second gear 22B) in accordance with rotation of the first gear 22A (second gear 22B). Since the central axis of the first gear 22A (second gear 22B) is parallel to the output shaft of the motor 20, the torque roller reciprocates in the launch direction DR1 and the separating direction DR2 in accordance with the rotation of the first gear 22A (second gear 22B). When the plunger 32 is located in the vicinity of the bottom dead center, the torque roller of the first gear 22A is engaged with one convex portion provided on the bottom dead center side as the gear engagement portion 32A1. Since the torque roller moves in the separating direction DR2 in accordance with the rotation of the first gear 22A, the gear engagement portion 32A1 of the plunger 32 is pushed up in the separating direction DR2, and thus the plunger 32 can be moved in the separating direction DR2. When the torque roller of the first gear 22A moves farthest in the separating direction DR2, the torque roller of the second gear 22B engages with the other convex portion provided on the top dead center side as the gear engagement portion 32A1. Since the torque roller moves in the separating direction DR2 in accordance with the rotation of the second gear 22B, the gear engagement portion 32A1 of the plunger 32 is further pushed up in the separating direction DR2, and thus the plunger 32 can be further moved in the separating direction DR2. When the torque roller of the second gear 22B moves farthest in the separating direction DR2, the plunger 32 reaches the top dead center, and engagement between the gear engagement portion 32A1 and the second gear 22B is released.

The driving tool 10 further includes a control unit 50 configured to drive the motor 20. The control unit 50 is mounted on a PCB board 24 (FIG. 2) disposed in a gap between the motor 20 and the battery B in the bridge portion 12C.

Figure 8:
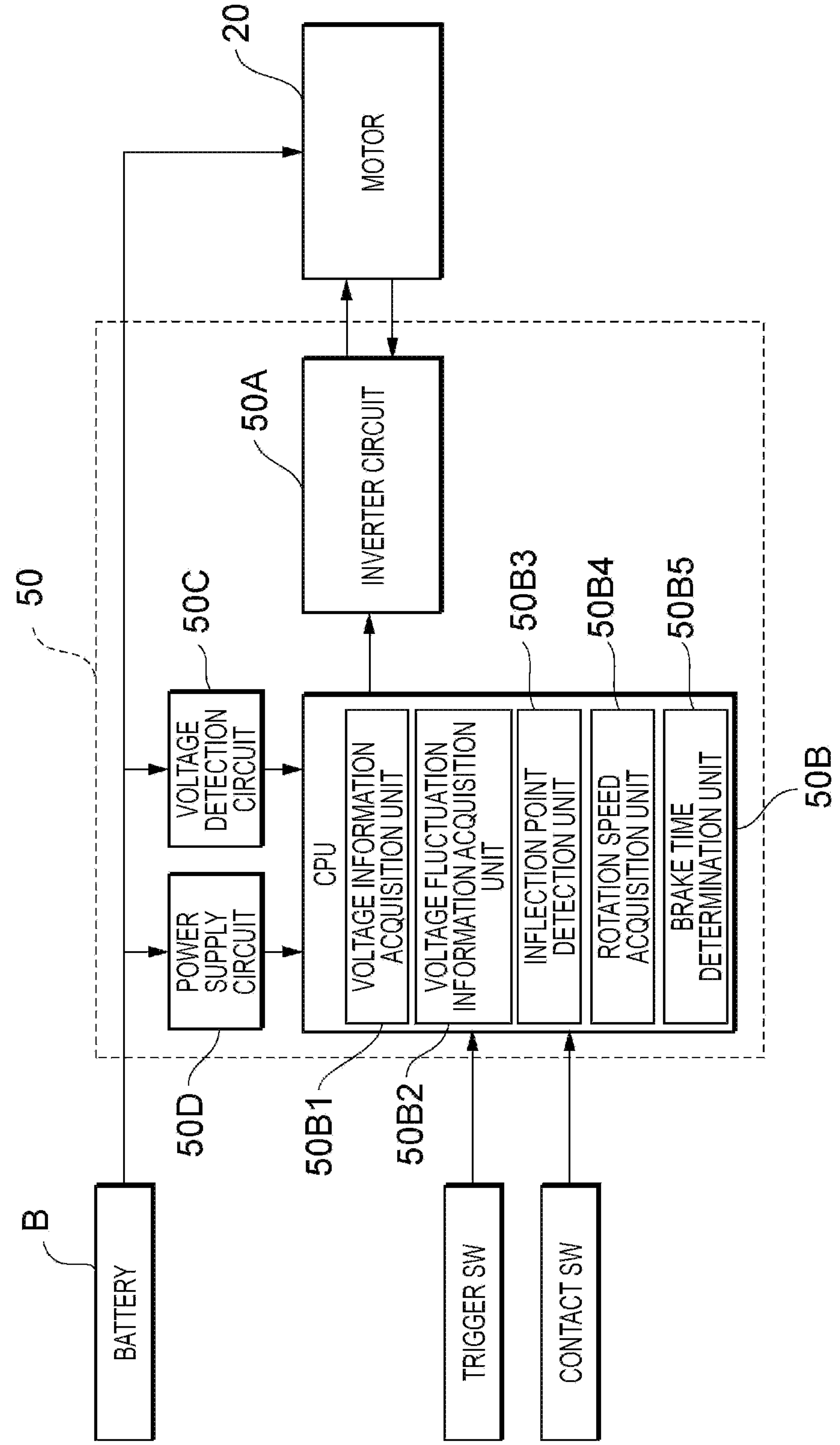
FIG. 8 is a control block diagram of the driving tool according to the embodiment.

FIG. 8 is a control block diagram of the driving tool 10. The motor 20 to be controlled includes a rotor and a stator including a three-phase winding (an example of a "stator winding"). The motor 20 is configured to be capable of causing a three-phase AC current to flow through the three-phase winding so as to generate a rotating magnetic field and thus rotate the rotor that includes a permanent magnet. It should be noted that the motor 20 is not provided with any position detection sensor, such as a Hall IC, for detecting a position of the rotor of the motor 20. However, the motor 20 may also be provided with the position detection sensor for detecting the position of the rotor.

The control unit 50 includes: an inverter circuit 50A configured to apply a voltage to the three-phase winding of the motor 20; a CPU 50B that generates a control signal for switching the inverter circuit 50A and supplies the control signal to the inverter circuit 50A; a voltage detection circuit 50C configured to detect a voltage of the battery B; and a power supply circuit 50D that supplies electric power output from the battery B to each active component such as the CPU 50B.

The inverter circuit 50A is constituted by, for example, six switching elements formed by, for example, field effect transistors (FET) or insulated gate bipolar transistors (IGBT) connected in a three-phase bridge connection between a positive bus (power supply line) and a negative bus (ground line) connected to an output terminal of the battery B, and free wheel diodes respectively connected in parallel to these switching elements. Three output terminals of the inverter circuit are respectively connected the three-phase winding of the motor 20.

The CPU 50B is constituted by hardware including: a nonvolatile semiconductor memory (for example, a flash memory) that stores a computer program configured to execute arithmetic processing and the like described in the present embodiment such as a control program of the motor 20; a volatile semiconductor memory (SRAM and DRAM) that temporarily stores data such as an arithmetic processing result; a processor that executes the computer program read from the semiconductor memory and generates a control signal for controlling the inverter circuit 50A; and a driver circuit that generates a pulse width modulated (PWM) drive signal (PWM signal) supplied to a base (or gate) of each switching element of the inverter circuit 50A based on the control signal generated by the processor.

The CPU 50B includes: a voltage information acquisition unit 50B1 that acquires, from the voltage detection circuit 50C, voltage information indicating a voltage applied to the motor 20; a voltage fluctuation information acquisition unit 50B2 that acquires information indicating a fluctuation amount of the voltage per unit time based on the voltage information acquired by the voltage information acquisition unit 50B1; an inflection point detection unit 50B3 that detects an inflection point (a maximum point) of the fluctuation amount of the voltage at which a fluctuation amount of the fluctuation amount of the voltage per unit time changes from positive to negative based on the voltage fluctuation information acquired by the voltage fluctuation information acquisition unit 50B2; a rotation speed acquisition unit 50B4 that acquires information indicating a rotation speed of the motor 20; and a brake control time determination unit 50B5 that sets time from when the inflection point is detected to when brake control of the motor 20 is started (hereinafter, referred to as "brake start timing") based on the rotation speed of the motor 20 when the inflection point is detected by the inflection point detection unit 50B3.

Figure 9:
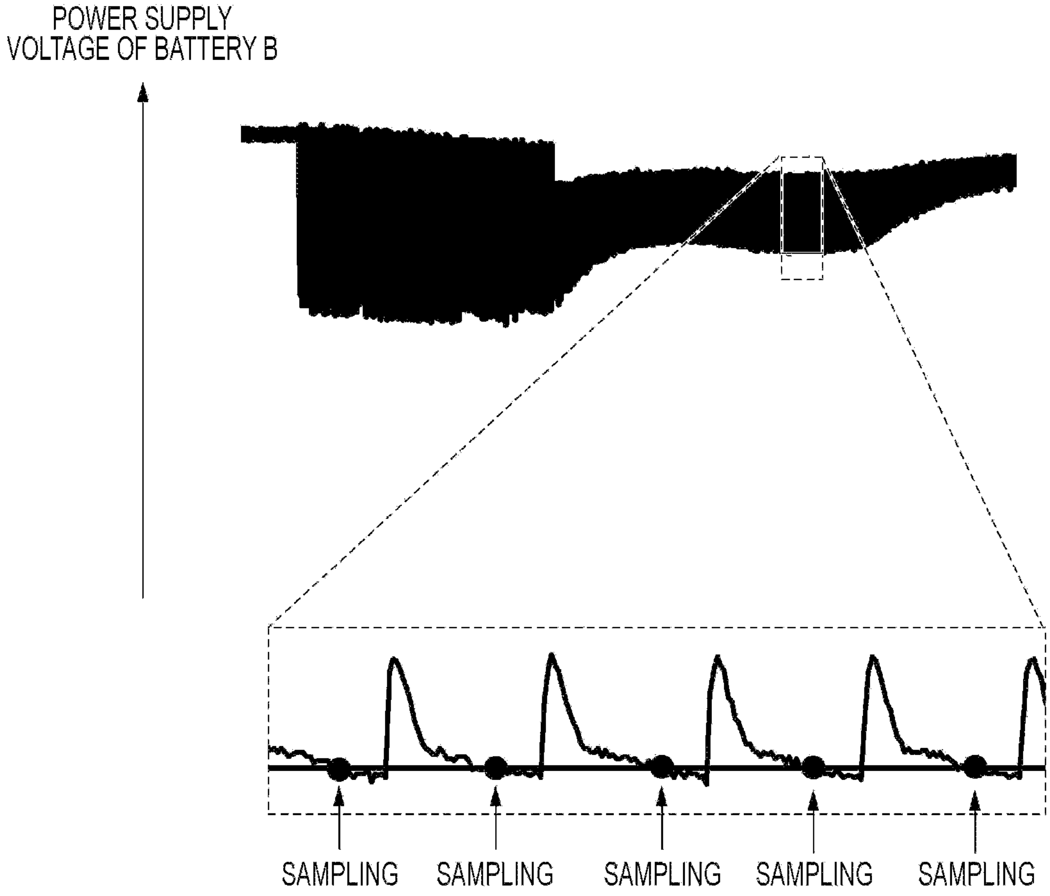
FIG. 9 shows an example of a waveform of an output voltage (a power supply voltage) of a battery.
Figure 10:
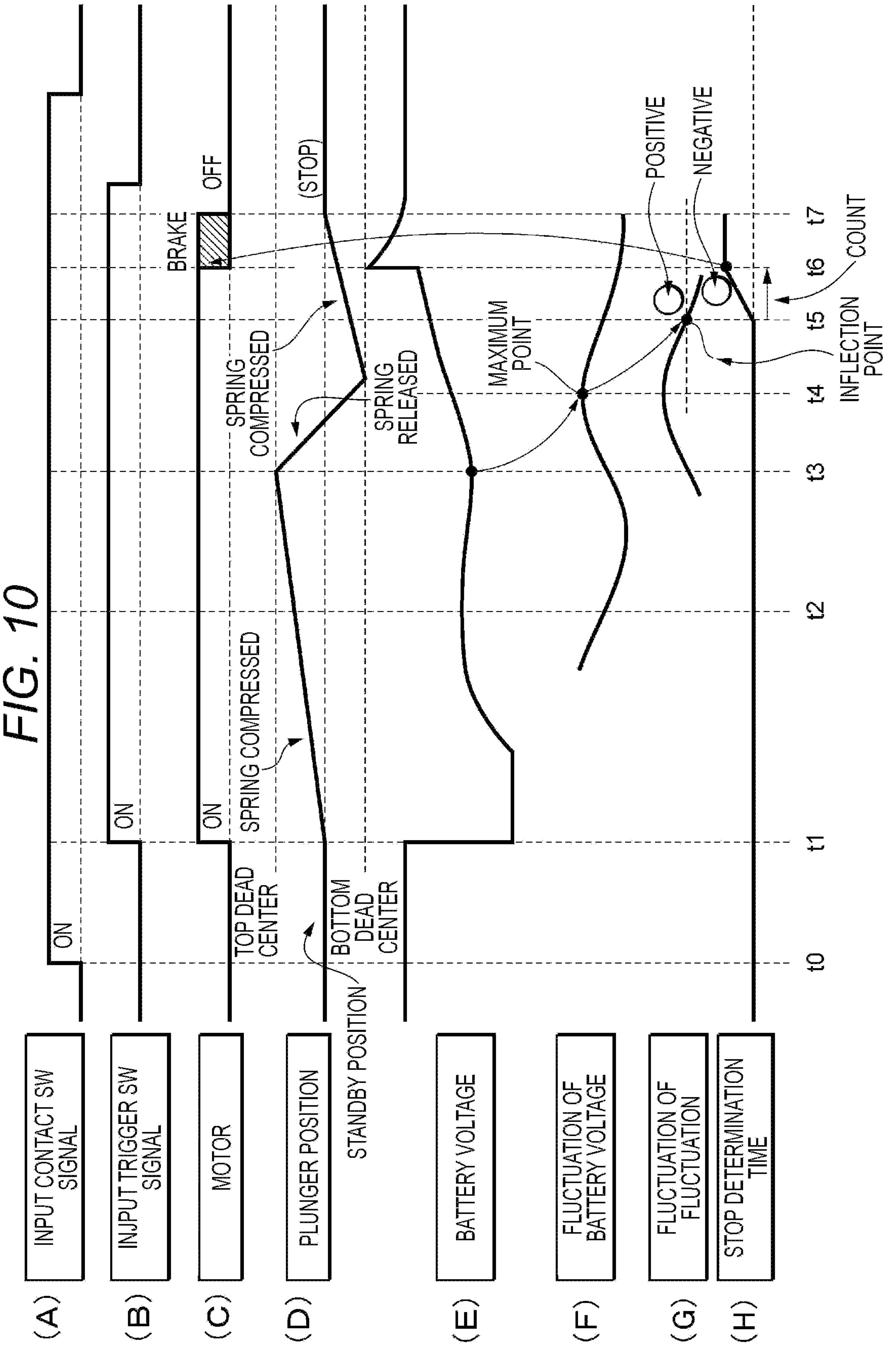
FIG. 10 is a timing chart showing a driving method according to the embodiment.

The voltage information acquisition unit 50B1 acquires, from the voltage detection circuit 50C, the information indicating the voltage applied to the motor 20. The inventors of the present application have focused on the point that the voltage applied to the motor 20 fluctuates during an operation of one cycle of the driving tool 10, and have conceived that a position of the plunger 32 is estimated based on the voltage fluctuation information, and the motor 20 is controlled based on the estimated position. However, it has been found that a signal acquired from the voltage detection circuit 50C finely fluctuates since a ripple occurs each time when the switching element of the inverter circuit 50A is switched. FIG. 9 shows an original waveform of the output voltage (power supply voltage) of the battery B acquired from the voltage detection circuit 50C and an enlarged view thereof (however, a scale of the enlarged view is changed for convenience). The voltage information acquisition unit 50B1 is configured to be capable of acquiring the voltage of the battery B at which an influence of the ripple is reduced by sampling a signal value immediately before the switching element of the inverter circuit 50A executes the switching among signals acquired from the voltage detection circuit 50C. (E) of FIG. 10 shows the voltage of the battery B obtained by sampling the signal value immediately before the switching and connecting adjacent signal values.

The voltage fluctuation information acquisition unit 50B2 acquires the voltage fluctuation information based on the voltage information sampled by the voltage information acquisition unit 50B1 at a predetermined cycle (for example, 3 ms to 6 ms). Specifically, information corresponding to a derivative of the voltage is acquired by acquiring a difference between sampled voltage information and voltage information sampled immediately one cycle before. However, in order to reduce an influence of noise or the like, the voltage fluctuation information may be acquired based on voltage information obtained by averaging a plurality of samples.

The inflection point detection unit 50B3 detects the inflection point (a maximum point of the voltage fluctuation amount) at which a fluctuation amount of the voltage fluctuation amount changes from positive to negative based on the voltage fluctuation information acquired by the voltage fluctuation information acquisition unit 50B2. Specifically, based on the voltage fluctuation information acquired by the voltage fluctuation information acquisition unit 50B2, it is determined whether the fluctuation amount of the voltage fluctuation amount is equal to or higher than 0, and the inflection point is detected when it is detected that the fluctuation amount of the voltage fluctuation amount is not equal to or higher than 0 (that is, negative). However, in order to reduce the influence of noise or the like, the inflection point may be detected when it is continuously detected that the fluctuation amount of the voltage fluctuation amount is not equal to or higher than 0.

As will be described later, the inflection point (the maximum point of the voltage fluctuation amount) at which the fluctuation amount of the voltage fluctuation amount changes from positive to negative is observed when the plunger 32 reaches the top dead center. Therefore, when the inflection point of the voltage fluctuation amount is detected, it is possible to estimate that the plunger 32 is present in the vicinity of the top dead center. Therefore, a stop position of the plunger 32 can be stabilized by controlling the motor 20 based on the detection of the inflection point at which the fluctuation amount of the voltage fluctuation amount changes from positive to negative.

The rotation speed acquisition unit 50B4 acquires information indicating the number of times of rotation per unit time (rotation speed) of the rotor of the motor 20. For example, the rotation speed acquisition unit 50B4 acquires the number of times of rotation based on a phase voltage of the motor 20. More specifically, it is possible to acquire the information indicating the rotation speed of the rotor of the motor 20 by acquiring information indicating time when a back electromotive force generated in a non-energized phase becomes a zero cross point at which the back electromotive force becomes equal to a midpoint potential of the voltage of the battery B and acquiring an interval between such zero cross points. The zero-cross point may be detected relative to a phase voltage of one winding of the three-phase winding, or zero-cross points of phase voltages of windings of two phases or all phases may be detected. In addition, instead of acquiring the number of times of rotation based on the phase voltage, the information indicating the rotation speed may be acquired through using a position detection sensor such as a Hall IC.

The brake control time determination unit 50B5 determines the brake start timing from when the inflection point is detected to when the brake control of the motor 20 is started based on the rotation speed of the motor 20 when the inflection point is detected by the inflection point detection unit 50B3. When the inflection point is detected, it is estimated that the plunger 32 is present in the vicinity of the top dead center, and thus it is possible to set time until the brake control of the motor 20 is started in consideration of time required for the plunger 32 to reach the bottom dead center from the top dead center. Here, the brake control time determination unit 50B5 may be further configured to be capable of changing the brake start timing based on the rotation speed of the motor 20 when the inflection point is detected by the inflection point detection unit 50B3. For example, in a case where the rotation speed of the motor 20 is high, it is considered that time until the plunger 32 reaches the standby position is shorter than in a case where the rotation speed of the motor 20 is not high, and thus it is possible to set the brake start timing to be shorter than usual and control the motor 20 to brake earlier. On the other hand, in a case where the rotation speed of the motor 20 is low, it is considered that the time until the plunger 32 reaches the standby position is longer than in a case where the rotation speed of the motor 20 is not low, and thus it is possible to set the brake start timing to be longer than usual and control the motor 20 to brake later.

With such a configuration, it is possible to control the position of the plunger 32 while preventing an influence of variations due to changes over time such as component wear, a remaining amount of the battery B, and the like.

The voltage detection circuit 50C acquires the voltage information indicating the voltage applied to the motor 20, and supplies the voltage information to the CPU 50B. Specifically, the voltage detection circuit 50C includes a plurality of resistance elements connected in series to the positive bus connected to the output terminal of the battery B, and is configured to supply a divided voltage value to the CPU 50B. As compared with current detection circuits according to other embodiments, the voltage detection circuit can be constituted by a plurality of resistance elements while active elements are not necessary, which is advantageous in terms of costs.

The power supply circuit 50D supplies the electric power output from the battery B to each active component such as the CPU 50B.

Hereinafter, a driving method using the driving tool 10 according to the present embodiment will be described. FIG. 10 is a timing chart showing the driving method performed by the driving tool 10.

In FIG. 10, a horizontal axis represents time. (A) of FIG. 10 shows a contact SW signal indicating whether the contact arm 12D1 is in contact with the driving destination object into which the fastener F is to be driven. At time t0, when the contact arm 12D1 comes into contact with the driving destination object, the contact SW signal is ON. The CPU 50B receives the contact SW signal and detects that the contact arm 12D1 is in contact with the object. Thereafter, as long as the contact arm 12D1 is in contact with the driving destination object, the contact SW signal continues to be in the ON state.

(B) of FIG. 10 shows a trigger SW signal indicating whether the trigger 12E is pressed. At time t1, when the operator presses the trigger 12E, the trigger SW signal is ON. The CPU 50B receives the trigger SW signal and detects that the trigger 12E is pressed. Thereafter, as long as the trigger 12E is pressed, the trigger SW signal continues to be in the ON state.

(C) of FIG. 10 shows a state of the motor 20. At time t1, when both the trigger SW signal and the contact SW signal are in the ON state, the CPU 50B supplies a PWM signal for driving the motor 20 to the inverter circuit 50A. Each switching element of the inverter circuit 50A performs a switching operation based on the PWM signal from the CPU 50B. When the switching element is ON, the output voltage of the battery B is applied to the three-phase winding constituting the stator of the motor 20, and thus a winding current flows through windings of each phase. The rotor of the motor 20 starts to rotate in accordance with the rotating magnetic field generated by the three-phase winding.

(D) of FIG. 10 shows the position of the plunger 32. In an initial state before time t1, the plunger 32 is stationary at the standby position between the top dead center and the bottom dead center. When the motor 20 starts driving at time t1, the torque roller provided in the second gear 22B comes into contact with the gear engagement portion 32A1 of the plunger 32 and pushes up the plunger 32 in the separating direction DR2. Since the plunger 32 is connected to the moving member 38 by the wire 40, the moving member 38 moves in the launch direction DR1 while compressing the coil spring 36 in conjunction with the movement of the plunger 32 in the separating direction DR2.

While the plunger 32 is moving from the top dead center to the bottom dead center, the voltage information acquisition unit 50B1 of the CPU 50B acquires the information indicating the voltage applied to the motor 20, the voltage fluctuation information acquisition unit 50B2 acquires the voltage fluctuation information, and the inflection point detection unit 50B3 periodically determines whether the fluctuation amount of the voltage fluctuation amount is equal to or higher than 0.

(E) of FIG. 10 shows the voltage of the battery B (corresponding to the information indicating the voltage applied to the motor 20) acquired by the voltage information acquisition unit 50B1 of the CPU 50B. (F) of FIG. 10 shows the fluctuation amount of the voltage of the battery B (corresponding to the voltage fluctuation information indicating the fluctuation amount of the voltage applied to the motor 20) acquired by the voltage fluctuation information acquisition unit 50B2 of the CPU 50B. The fluctuation amount of the voltage of the battery B is approximated to a derivative of the battery B by increasing a sampling frequency. (G) of FIG. 10 shows the fluctuation amount of the voltage fluctuation amount of the battery B. The fluctuation amount of the voltage fluctuation amount of the battery B is approximated to a second derivative of the battery B by increasing the sampling frequency.

As shown in (E) of FIG. 10, the voltage applied to the motor 20 during the operation of the driving tool 10 in one cycle fluctuates. When the motor 20 starts driving at time t1, the winding current flows, and thus the output voltage of the battery B decreases. When the winding current reaches an upper limit value since a start load is large, the output voltage is maintained in a lowered state as shown in the same figure. An amount of decrease in the output voltage of the battery B is, for example, 3V to 8V, depending on specifications of the driving tool 10 and the like.

Thereafter, when the winding current becomes lower than the upper limit value, the output voltage of the battery B increases. However, as shown after time t2, as the plunger 32 approaches the top dead center, the coil spring 36 is compressed, and thus an urging force of the coil spring 36 increases. Since the plunger 32 is moved in the direction toward the top dead center against the urging force, the winding current increases. Therefore, the output voltage of the battery B starts to decrease. At this time, as shown in (F) of FIG. 10, the fluctuation of the voltage of the battery B may have a negative value.

At time t3, the plunger 32 reaches the top dead center. At this time, engagement between the plunger 32 and the gear 22 is released. Therefore, the coil spring 36 in the compressed state extends at once. The moving member 38 moves together with the other end of the coil spring 36 in the separating direction DR2 corresponding to the extension direction of the coil spring 36. Since the moving member 38 is connected to the plunger 32 by the wire 40, the plunger 32 and the driver 34 are moved in the launch direction DR1 in conjunction with the movement of the moving member 38 in the separating direction DR2.

Figure 11:
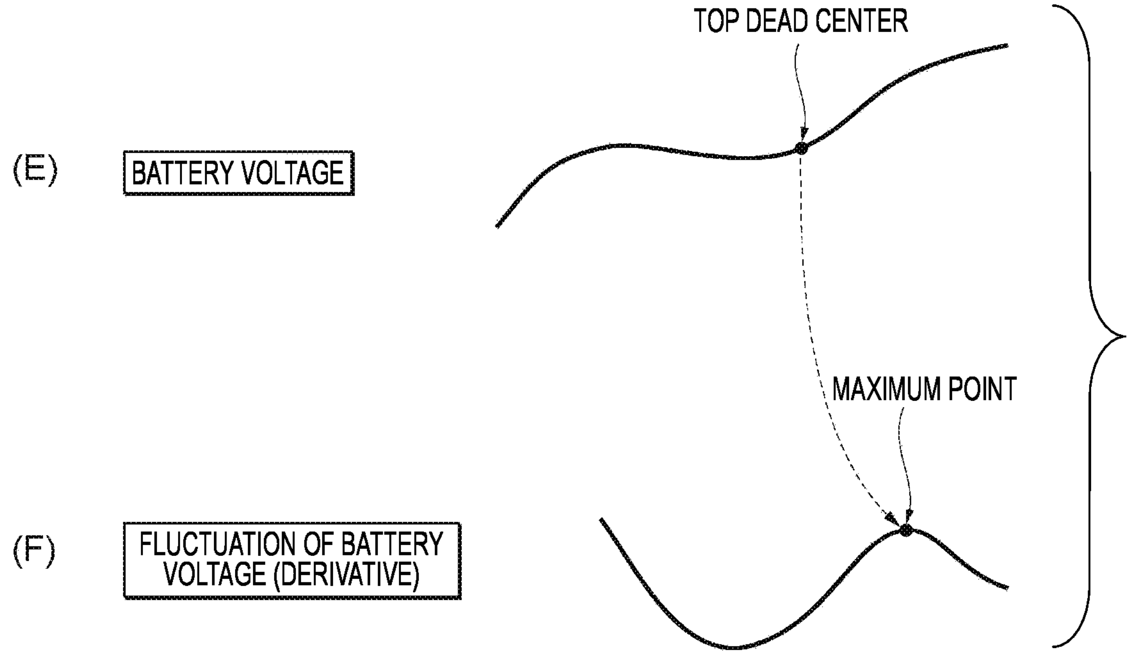
FIG. 11 shows a voltage fluctuation amount when the plunger of the driving tool according to the embodiment reaches a top dead center.

(E) and (F) of FIG. 11 is an enlarged view of the voltage of the battery B and the fluctuation of the voltage of the battery B when the plunger 32 reaches the top dead center at time t3. As shown in the same figure, when the plunger 32 reaches the top dead center, urging of the coil spring 36 is released and addition of the motor 20 rapidly decreases, and thus there appears a moment when a motor current suddenly decreases while the output voltage of the battery B suddenly increases, and then the output voltage of the battery B gradually increases. Therefore, based on the fact that the plunger 32 reaches the top dead center, the derivative of the output voltage of the battery B becomes a maximum point at time t4. At time t5, the inflection point detection unit 50B3 detects the inflection point of the battery voltage based on the maximum point. In order for the inflection point detection unit 50B3 to detect the inflection point, it is necessary to detect that the second derivative of the output voltage of the battery B (the fluctuation of the voltage fluctuation) is negative, and thus a time difference occurs between time t4 and time t5. Therefore, in the present embodiment, the inflection point detection unit 50B3 is configured to detect the maximum point when the plunger 32 reaches the bottom dead center and moves from the bottom dead center to the top dead center (or when the plunger 32 moves from the bottom dead center to the standby position).

At time t5, the rotation speed acquisition unit 50B4 acquires the information indicating the number of times of rotation per unit time (rotation speed) of the rotor of the motor 20 when the inflection point detection unit 50B3 detects the inflection point.

At the same time t5, the brake control time determination unit 50B5 determines the brake start timing based on the rotation speed of the motor 20 acquired from the rotation speed acquisition unit 50B4. Specifically, a lookup table for determining the brake start timing based on the rotation speed may be stored in the nonvolatile semiconductor memory of the CPU 50B.

At the same time t5, when the brake control time determination unit 50B5 determines the brake start timing, a counter of the CPU 50B starts counting up ((H) of FIG. 10).

While the plunger 32 is moving from the top dead center to the bottom dead center, the CPU 50B supplies a control signal for rotating the rotor of the motor 20 to the inverter circuit 50A, and thus the rotor of the motor 20 continues to rotate. Since a force that hinders the rotation of the motor 20 is released, the rotation speed of the rotor of the motor 20 may increase. When the plunger 32 reaches the vicinity of the bottom dead center (or immediately before the reaching), the driver 34 that moves in the launch direction DR1 together with the plunger 32 launches the fastener F supplied to the nose portion 12D in the launch direction DR1. The fastener F is launched from the outlet 12A.

When the plunger 32 reaches the bottom dead center, the first gear 22A that rotates in synchronization with the rotor of the motor 20 is configured to engage with the gear engagement portion 32A1 of the plunger 32. Therefore, the plunger 32 starts to move from the bottom dead center toward the top dead center. As the plunger 32 moves toward the top dead center, the coil spring 36 is compressed.

At time t6, when the counting of the CPU 50B reaches a predetermined value, the CPU 50B starts deceleration control for decelerating the rotation of the motor 20, for example, starts brake control as an example of the deceleration control. Specifically, the CPU 50B generates a PWM signal having a duty ratio smaller than that during normal rotation, and outputs the PWM signal to each switching element of the inverter circuit 50A.

The rotation speed of the rotor of the motor 20 is significantly reduced by the deceleration control performed by the CPU 50B. At this time, since regenerative electric power is generated along with the deceleration of the motor 20, the voltage of the battery B further increases as shown in (E) of FIG. 10.

As shown in (D) of FIG. 10, even if the rotation speed decreases, the plunger 32 continues to move gradually toward the top dead center since the motor 20 rotates.

Various methods can be employed for the deceleration control for reducing the rotation speed of the rotor of the motor 20. For example, a short-circuit brake (short brake) of turning off energization to an upper arm of the inverter circuit and energizing only a lower arm may be employed. In this case, a braking force is high, but an amount of heat generated by the motor is large. In addition, regenerative brake cannot be used.

In addition, chopper control (chopper brake) may be applied to the short circuit brake by turning off the energization to the upper arm of the inverter circuit, generating a PWM signal for energizing only the lower arm, and energizing only the lower arm based on the PWM signal. In this case, although the braking force is reduced as compared with the short-circuit brake, it is possible to reduce the amount of heat generated by the motor. In addition, the regenerative brake can be used.

Further, an open brake that turns off energization to the upper arm and the lower arm of the inverter circuit may be employed. In this case, although the braking force is significantly reduced, the amount of heat generated by the motor can also be significantly reduced. In addition, the regenerative brake cannot be used.

Thereafter, at time t7, the rotor of the motor 20 stops rotating. Timing when the rotation of the motor 20 is stopped can be set as appropriate. For example, a control signal pattern for brake control may be prepared such that the motor 20 is stopped when the CPU 50B outputs a control signal in accordance with a predetermined pattern to the inverter circuit 50A.

Figure 12:
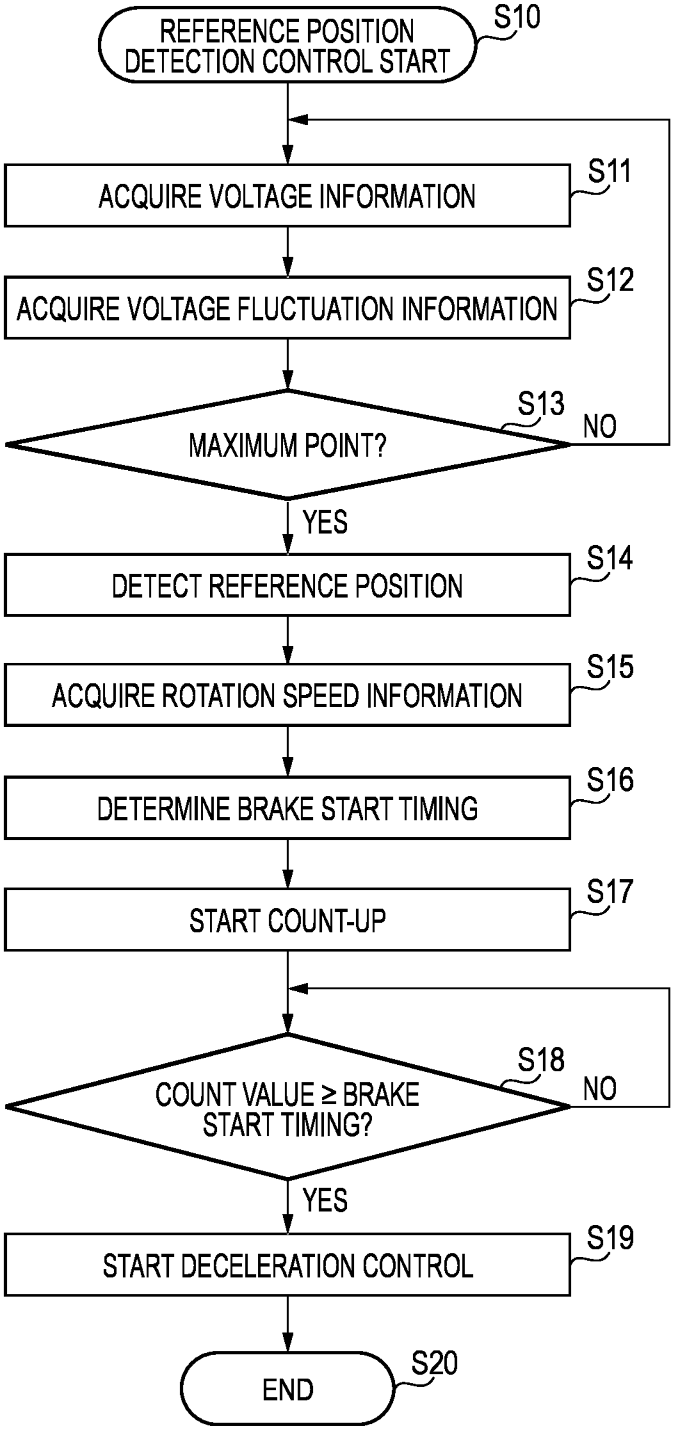
FIG. 12 is a flowchart of the driving method according to the embodiment.

FIG. 12 is a flowchart showing a process for controlling the stop position of the plunger 32 among the series of processes described above.

In step S10, the CPU 50B starts a process for detecting a reference position. The process of detecting the reference position does not necessarily have to be started from the time t1, which is a time point when the driving of the motor 20 is started. For example, the process of detecting the reference position may be executed after a predetermined time has elapsed (for example, at timing before the plunger 32 reaches the top dead center) through using the counter after the start of the driving of the motor 20.

Next, the voltage information acquisition unit 50B1 of the CPU 50B acquires the voltage information of the battery B (step S11), and the voltage fluctuation information acquisition unit 50B2 acquires the voltage fluctuation information of the battery B based on the acquired voltage information (step S12).

The inflection point detection unit 50B3 of the CPU 50B determines whether the voltage fluctuation amount is the maximum point (step S13). Specifically, whether the fluctuation amount of the voltage fluctuation amount is equal to or higher than 0 is determined based on the voltage fluctuation information acquired by the voltage fluctuation information acquisition unit 50B2. If the voltage fluctuation amount is not the maximum point (NO), step S11 and the subsequent steps are periodically repeated. Logic for determining the maximum point can be set in various ways. For example, when the fluctuation amount of the voltage fluctuation amount is positive for two consecutive times and then the fluctuation amount of the voltage fluctuation amount is negative for two consecutive times, it may be determined that the maximum point is reached.

When the voltage fluctuation is the maximum point (YES), the CPU 50B determines that the top dead center is detected as the reference position of the plunger 32 (step S14).

The rotation speed acquisition unit 50B4 of the CPU 50B acquires the rotation speed information of the motor 20 when the top dead center is detected (step S15), and the brake control time determination unit 50B5 determines the brake start timing based on the rotation speed of the motor

20 (step S16). For example, when the rotation speed of the rotor acquired in step S15 is high, a threshold value is set to be small such that the brake start timing becomes earlier, and when the rotation speed of the rotor is low, the threshold value is set to be large such that the brake start timing becomes later. Even if the same driving is performed corresponding to changes over time of each component of the driving tool 10, a speed of the plunger 32, the rotation speed of the rotor of the motor 20, and the like may vary. Therefore, the driving tool 10 is configured to acquire the rotation speed of the rotor of the motor 20 and control the motor 20 based on the rotation speed. Here, the rotation speed of the rotor used for the control performed by the CPU 50B is the rotation speed of the rotor after the plunger 32 reaches the bottom dead center. Since the rotation speed of the rotor of the motor 20 becomes larger after the plunger 32 reaches the bottom dead center, and thus variation in the rotation speed of the rotor becomes larger, the stop position of the plunger 32 can be more stabilized by controlling the motor 20 based on information indicating the rotation speed of the rotor after the plunger 32 reaches the bottom dead center. Based on the rotation speed, logic for determining the brake start timing, which is a reference for starting the deceleration control, can be appropriately designed according to a configuration of an actual driving tool.

Further, the CPU 50B determines whether the count value since the count-up is started in step S17 is equal to or higher than a threshold value set based on the brake start timing (step S18).

When it is determined in step S18 that the count value is equal to or higher than the threshold value (YES), the CPU 50B starts the deceleration control (for example, the brake control) so as to decelerate the rotation of the motor 20 (step S19). An example of the brake control method has been described above, and thus description thereof will be omitted.

If it is determined in step S18 that the count value is not equal to or higher than the threshold value (NO), step S18 is periodically re-executed.

When the CPU 50B completes the brake control, the control unit 50 including the CPU 50B ends the control of the motor 20 (step S20). At this time, the rotation of the rotor of the motor 20 is stopped. In addition, the plunger 32 stops at the stop position (the standby position).

When fasteners are continuously driven, operations after time t1 in FIG. 10 are repeated.

In the driving tool 10 as described above, the control unit 50 is configured to control the motor 20 based on the fluctuation amount of the voltage applied to the motor 20. Therefore, even when an absolute value of the rotation speed varies due to a decrease in the battery voltage, the changes over time of components, or the like, it is possible to stabilize the stop position of the plunger. Therefore, it is possible to reduce variation in response time from the stop position to execution of driving.

Further, it is also possible to reduce the number of sensors (typically, micro-switches) for detecting the top dead center. Since the driving tool is required to have favorable dustproof and waterproof performance, it is necessary to appropriately install each micro switch in consideration of dust, mechanical oil, intrusion of water from the outside, and the like. However, chattering may occur as a mechanical contact of the micro switch is worn due to an impact at the time of driving, and the sensor may not be capable of normally detecting the top dead center. Although a filter circuit may be provided as a countermeasure against the chattering, a time lag until signal confirmation occurs due to filtering. According to the driving tool 10 according to the present embodiment, the motor can be controlled without using any micro switch. However, a modification may be made such that a micro switch is installed and the motor and the plunger position are controlled together with information acquired from the micro switch.

Similarly, the number of Hall ICs can be reduced. Since each Hall IC is also required to have dustproof performance and waterproof performance as in the case of the micro switch, installation of the Hall IC leads to an increase in size and cost of a driving device. According to the driving tool 10 according to the present embodiment, the motor can be controlled without using any Hall IC. However, a modification may be made such that a Hall IC is installed, information indicating a fluctuation amount of the rotation speed is acquired based on information from the Hall IC, and the motor and the plunger position are controlled based on the information.

Although the control unit 50 detects the maximum point of the voltage fluctuation amount as the information indicating the fluctuation of the voltage, and uses the maximum point for the control of the motor 20, the present invention is not limited thereto. For example, time when the voltage fluctuation amount exceeds a threshold value may be detected and used for the control of the motor. In such a case, it is still possible to reduce an influence of variation in an absolute value of the voltage due to consumption of the battery or the like. Alternatively, another inflection point of the voltage fluctuation may be detected and used for the control of the motor. Further, a waveform of assumed voltage fluctuation may be prepared in advance, and the motor may be controlled based on a comparison with an actual voltage fluctuation waveform. However, since the maximum point of the voltage fluctuation is a feature that occurs when the plunger moves from the top dead center to the bottom dead center, stable position control of the plunger is facilitated by detecting the maximum point.

Further, the inventors of the present application have focused on the point that the absolute value of the rotation speed of the motor may be different even if the fluctuation amount of the voltage is the same, and have adopted a configuration in which the plunger position is controlled based on the rotation speed. For example, the rotation speed of the rotor may be different at the same timing due to wear of main components of the driving tool. Therefore, the plunger position is controlled based on the rotation speed of the motor in addition to the voltage fluctuation amount. With this configuration, the stop position of the plunger can be controlled more accurately.

For example, in a case where the absolute value of the rotation speed of the motor is large, if normal brake control is executed, the plunger may stop at a position closer to the top dead center than expected. On the other hand, when the absolute value of the rotation speed of the motor is small, if the normal brake control is executed, the plunger may stop at a position closer to the bottom dead center than expected. Therefore, by controlling the motor based on the rotation speed of the rotor at predetermined timing, it is possible to prevent variation in the stop position of the plunger due to variation in the rotation speed of the rotor.

In addition, although the driving tool 10 according to the present embodiment acquires the information indicating the rotation speed of the motor based on the phase voltage, it may also be configured such that the information indicating the rotation speed of the motor is acquired based on a phase current, for example.

Further, although the driving tool 10 uses the counter as means for determining the brake start timing, the present invention is not limited thereto. For example, the driving tool 10 may measure a rotation amount (the number of times of rotation) of the motor 20 and determine the brake start timing based on the rotation amount. For example, the driving tool may be configured such that the brake start timing is determined when the motor 20 rotates 20 times since detection of the top dead center. As means for measuring the rotation amount of the motor 20, for example, the rotation amount may be measured based on a change in the phase voltage through using the rotation speed acquisition unit 50B4, or the rotation amount may be measured through using a Hall IC or the like.

Various techniques can be used as means for moving the plunger through using a gear or the like driven by the motor and releasing engagement between the gear or the like and the plunger at the top dead center so as to move the plunger toward the bottom dead center. For example, means described in Patent Literatures 1 and 2 may be employed.

In addition, the present invention can be variously modified within a range of a normal creative ability of those skilled in the art. For example, the present invention can be applied to a driving tool for driving a fastener other than a nail.

[Second Embodiment] Hereinafter, a driving tool according to a second embodiment will be described. Components having the same functions as or functions similar to those of the other embodiments are denoted by the same names, and description thereof will be omitted.

The driving tool 10 according to the first embodiment has a configuration in which the motor 20 is controlled by determining the brake start timing based on the voltage fluctuation information and the rotation speed information of the motor 20.

The driving tool according to the present embodiment has a configuration in which the motor is controlled by determining a control pattern at the time of the deceleration control based on the voltage fluctuation information and the rotation speed information of the motor. A period in which such a control pattern is used may be a fixed period or a fluctuating period. As an example, the driving tool according to the present embodiment has a configuration in which the motor is controlled by selecting a control pattern in which a duty ratio of a PWM signal is different based on the voltage fluctuation information and the rotation speed information of the motor. More specifically, based on the voltage fluctuation information and the rotation speed information of the motor, when the rotation speed of the motor is a first rotation speed, a control signal in which a brake duty for decelerating the rotation of the motor is larger than a brake duty when the rotation speed of the motor is a second rotation speed lower than the first rotation speed is supplied to the inverter circuit of the motor.

With such a driving tool, the position of the plunger is still controlled based on the voltage fluctuation information, so that a standby position of the plunger can be stabilized.

[Third Embodiment] Hereinafter, a driving tool according to a third embodiment will be described. Components having the same functions as or functions similar to those of the other embodiments are denoted by the same names, and description thereof will be omitted.

The driving tool 10 according to the first embodiment has a configuration in which the motor 20 is controlled based on the voltage fluctuation information. The driving tool according to the present embodiment has a configuration in which the motor is controlled by determining a control pattern at the time of the deceleration control based on current fluctuation information and the rotation speed information of the motor.

Figure 13:
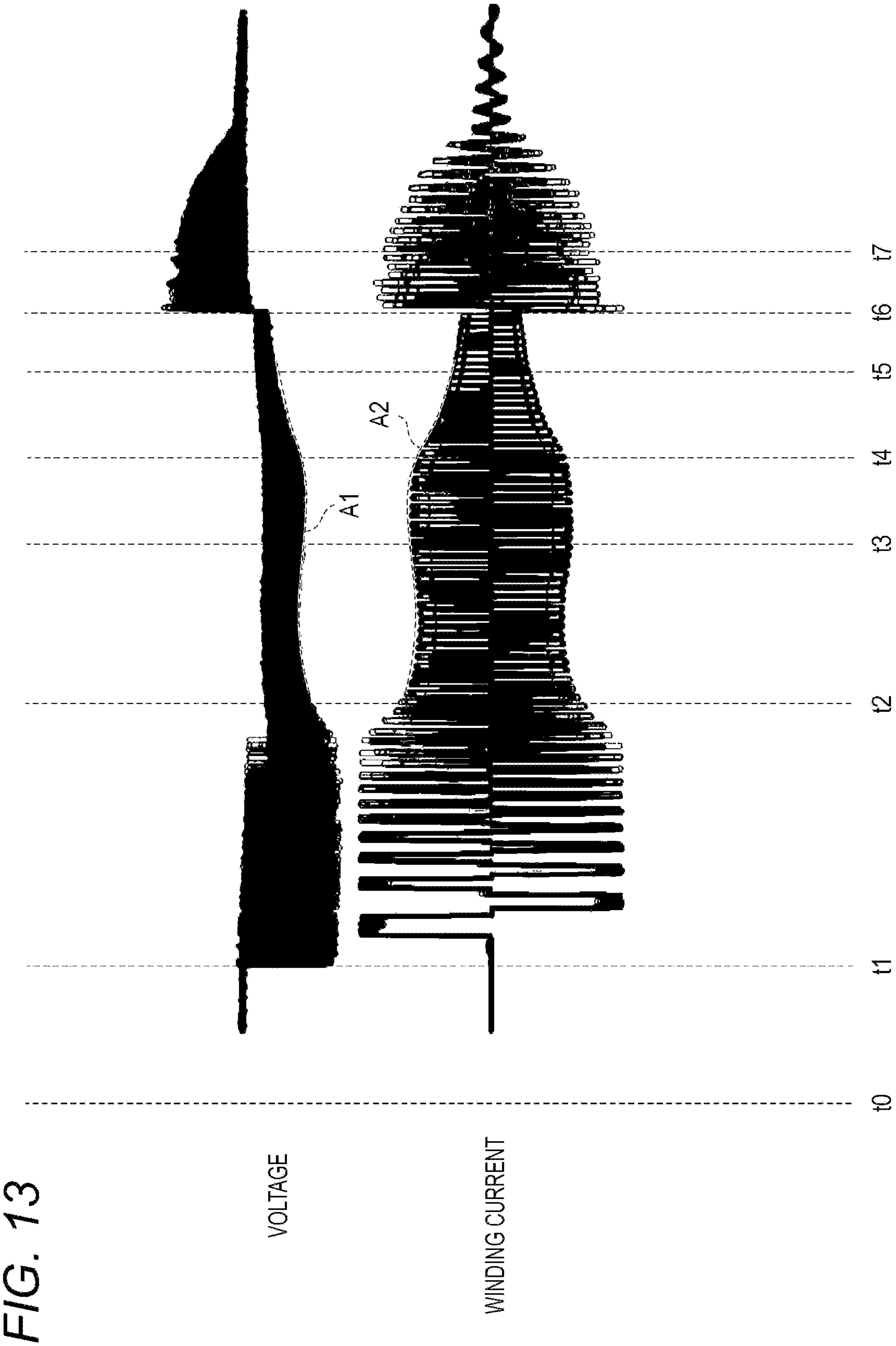
FIG. 13 is a graph showing the output voltage of the battery and a winding current of the driving tool according to the embodiment.

FIG. 13 is a graph showing the output voltage of the battery B and the winding current in one cycle of the driving tool including time t0 to t7. As shown in this graph, the inventors of the present application have found that there is a correlation between the output voltage of the battery B and the winding current. In particular, the inventors of the present application have focused on the point that an envelope A1 of the output voltage of the battery B and an envelope A2 of the winding current have symmetrical shapes.

Therefore, the driving tool according to the present embodiment includes a current fluctuation information acquisition unit configured to acquire current fluctuation information indicating a fluctuation amount of the current flowing through the motor 20 during the movement of the plunger 32, and is configured to control the motor 20 based on the current fluctuation information. The driving tool may further be configured to detect a minimum point of the current fluctuation based on the current fluctuation information, and control the motor 20 with reference to time when the minimum point is detected. When the plunger 32 reaches the top dead center, a load rapidly decreases, and thus the current fluctuation has the minimum point. Therefore, it is possible to estimate that the plunger 32 has reached the top dead center by detecting the minimum point of the current fluctuation.

Although the control unit 50 detects the minimum point of the current fluctuation as the information indicating a current fluctuation amount, and uses the minimum point for the control of the motor 20, the present invention is not limited thereto. For example, time when the current fluctuation amount exceeds a threshold value may be detected and used for the control of the motor. In such a case, it is still possible to reduce the influence of the variation in the absolute value of the voltage due to consumption of the battery or the like. Alternatively, another inflection point of the current fluctuation may be detected and used for the control of the motor. Further, a waveform of assumed current fluctuation may be prepared in advance, and the motor may be controlled based on a comparison with an actual current fluctuation waveform. However, since the minimum point of the current fluctuation is a feature that occurs when the plunger moves from the top dead center to the bottom dead center, stable position control of the plunger is facilitated by detecting the minimum point.

A known current detection circuit can be used as the unit for acquiring the current information serving as a basis of the current fluctuation information. Specifically, a minute voltage corresponding to the winding current is generated by causing a part of the winding current to flow through a resistance element, the minute voltage is amplified by a voltage amplifier circuit and supplied to the CPU 50B, and thus the current information can be acquired. In addition, the CPU 50B may include a current information acquisition unit and a current fluctuation information acquisition unit instead of or in addition to the voltage information acquisition unit and the voltage fluctuation information acquisition unit. In addition, the inflection point detection unit mounted on the CPU 50B may detect the minimum point when the current fluctuation information changes from negative to positive. These configurations can be implemented by executing a computer program stored in a semiconductor memory capable of storing information non-volatilely (also referred to as being non-transiently) by a processor (computer) mounted on the CPU 50B.

[Fourth Embodiment] Hereinafter, a driving tool according to a fourth embodiment will be described. Components having the same functions as or functions similar to those of the other embodiments are denoted by the same names, and description thereof will be omitted. The inventors of the present application have focused on the fact that characteristics of the motor vary depending on temperature. In a high load region, the number of times of rotation of a motor (particularly, a brushless motor) decreases when the temperature is high as compared with the case of normal temperature. On the other hand, in a low load region, there is a characteristic that the number of times of rotation increases when the temperature is high as compared with the case of normal temperature.

On the other hand, in the driving tool or the like according to each embodiment, the motor has a high load in the vicinity of the top dead center, and the motor has a low load at the start of the deceleration control thereafter. Therefore, at high temperature, a rotation speed of the motor in the vicinity of the top dead center is lower than the rotation speed at normal temperature, while the rotation speed of the motor during the deceleration control is higher than the rotation speed at the normal temperature. Therefore, when the same deceleration control as that at the normal temperature (low temperature) is applied when temperature is high, the stop position of the plunger may be deviated toward the top dead center.

Therefore, the driving tool according to the present embodiment further includes a temperature sensor that acquires temperature information indicating temperature of the motor in the driving tool according to the other embodiments, and a control unit that controls the motor based on the temperature information. More specifically, low-temperature stop control applied at normal temperature (low temperature) and high-temperature stop control applied at high temperature are different from each other. If the high-temperature stop control is applied at normal temperature, the plunger stops at a position closer to the bottom dead center than an original stop position. If the normal-temperature stop control is applied when temperature is high, the plunger stops at a position closer to the top dead center than the original stop position. For example, stop determination time is corrected based on the temperature information, and the stop determination time is set to be smaller in the case of high temperature than that in the case of normal temperature (low temperature). It should be noted that the stop determination may also be performed based on the rotation amount of the motor instead of the time. In this case, the control unit is configured to execute the stop determination when an actual motor rotation amount reaches a predetermined motor rotation amount. The predetermined motor rotation amount is corrected according to the temperature.

By adopting such a configuration, it is possible to stabilize the stop position of the plunger. The above configuration may be applied to the driving tool 10 according to the first embodiment, or may be applied to other driving tools. In addition, the temperature detection may be configured to detect motor temperature, or may be information having a correlation with the motor temperature (for example, temperature in the vicinity of the inverter circuit, temperature of the switching element, temperature on a board, and the like). For example, instead of acquiring the temperature information indicating the temperature of the motor, the driving tool according to the present embodiment may be modified so as to acquire temperature of an electrical component (for example, the switching element of the inverter circuit) other than the motor, and the motor may be controlled based on the acquired temperature information.

In addition, various modifications can be made to the present invention without departing from the gist thereof. For example, a part of the constituent elements in one embodiment may be added to other embodiments within the range of the normal creative ability of those skilled in the art. In addition, a part of the constituent elements in one embodiment can be replaced by corresponding constituent elements in other embodiments.

For example, in the driving tool according to the third embodiment, a part of the constituent elements that can be mounted on the driving tool according to the first embodiment may be applied.

The invention claimed is:

1. A driving tool comprising:

a plunger;

a motor configured to move the plunger from a bottom dead center to a top dead center;

a spring configured to cause the plunger to drive a fastener by moving the plunger from the top dead center to the bottom dead center; and a processor configured to acquire voltage fluctuation information indicating a fluctuation amount of a voltage applied to the motor during movement of the plunger, and configured to control the motor based on the voltage fluctuation information, wherein the processor is configured to control the motor based on an inflection point of the fluctuation amount of the voltage, wherein the inflection point is a time when a fluctuation amount of the fluctuation amount per unit time changes from one of: positive to negative or negative to positive.

2. The driving tool according to claim 1, wherein the processor is configured to acquire temperature information, and is further configured to start control to reduce a rotation speed of the motor based on the temperature information.

3. The driving tool according to claim 1, further comprising:

a battery configured to apply a voltage to the motor, wherein the processor is configured to acquire information indicating a fluctuation mount of a power supply voltage of the battery as the voltage fluctuation information.

4. A drive tool comprising:

a plunger;

a motor configured to move the plunger from a bottom dead center to a top dead center;

a spring configured to cause the plunger to drive a fastener by moving the plunger from the top dead center to the bottom dead center; and a processor configured to acquire current fluctuation information indicating a fluctuation amount of a current flowing through the motor during movement of the plunger, and configured to control the motor based on the current fluctuation information, wherein the processor is configured to control the motor based on an inflection point of the fluctuation amount of the current, wherein the inflection point is a time when a fluctuation amount of the fluctuation amount per unit time changes from one of: positive to negative or negative to positive.

5. A driving tool comprising:

a plunger;

a motor configured to move the plunger from a bottom dead center to a top dead center;

a spring configured to cause the plunger to drive a fastener by moving the plunger from the top dead center to the bottom dead center; and a processor configured to acquire speed information indicating a moving speed of the plunger after the plunger is moved from the top dead center to the bottom dead center, and configured to control the motor based on the speed information, wherein the processor is further configured to start control to reduce a rotation speed of the motor based on the speed information.

* * * * *